(12) United States Patent
 Huisinga et al.

(10) Patent No.: US 10,375,934 B2
(45) Date of Patent: Aug. 13, 2019

(54) STACKABLE POULTRY CONTAINER SYSTEM AND METHOD

(71) Applicant: LIFE-SCIENCE INNOVATIONS, LLC, Willmar, MN (US)

(72) Inventors: Richard Huisinga, Willmar, MN (US); Shawn Engstrom, Willmar, MN (US)

(73) Assignee: LIFE-SCIENCE INNOVATIONS, LLC, Willmar, MN (US)

( * ) Notice: Subject to any disclaimer, the term of this patent is extended or adjusted under 35 U.S.C. 154(b) by 415 days.

(21) Appl. No.: 15/164,115

(22) Filed: May 25, 2016

(65) Prior Publication Data

US 2016/0345545 A1    Dec. 1, 2016

Related U.S. Application Data

(60) Provisional application No. 62/166,466, filed on May 26, 2015.

(51) Int. Cl.
  *A01K 31/00* (2006.01)
  *A01K 45/00* (2006.01)
  *A01K 31/04* (2006.01)
(52) U.S. Cl.
  CPC .......... *A01K 31/005* (2013.01); *A01K 31/002* (2013.01); *A01K 31/007* (2013.01); *A01K 31/04* (2013.01); *A01K 45/005* (2013.01)
(58) Field of Classification Search
  CPC ........ A01K 31/06; A01K 31/07; A01K 31/14; A01K 39/00; A01K 39/01; A01K 39/014;
  (Continued)

(56) References Cited

U.S. PATENT DOCUMENTS 1,395,955 A    11/1921  Gentis
1,619,895 A     3/1927  Tarman
(Continued)

FOREIGN PATENT DOCUMENTS

AT    311 711 B    11/1973
CN    2 871 426 Y    2/2007
(Continued)

OTHER PUBLICATIONS

European Patent Application No. 18164122.6, filed May 25, 2016; European Search Report dated Jun. 18, 2018; 5 pages.
U.S. Appl. No. 29/528,124, filed May 26, 2015, Huisinga.

*Primary Examiner* — Trinh T Nguyen
(74) *Attorney, Agent, or Firm* — Mueting, Raasch & Gebhardt, P.A.

(57) ABSTRACT

Stackable poultry container systems are described herein along with methods of using the systems in connection with the care of poultry. The stackable poultry container systems described herein may include feeder apparatus that allow for the distribution of feed to all of the containers within a stack of containers through the feeder apparatus provided in the uppermost container in the stack. The stackable poultry container systems described herein may include a floor that has waste apertures formed therein to allow waste from animals located in the container to fall through the floor to improve sanitation for the animals located in the container system. The stacks of poultry containers may include waste shields located beneath each floor such that waste falling through the floor of a container does not pass into the container located below when the containers are stacked on top of each other.

28 Claims, 13 Drawing Sheets

(58) Field of Classification Search
CPC .... A01K 31/005; A01K 31/04; A01K 31/002; A01K 31/007; A01K 45/005; A01K 31/19; A01K 39/012; A01K 1/0151; A01K 31/18; A01K 5/00; A01K 1/0114; A01K 1/0107; A01K 41/065
See application file for complete search history.

(56) References Cited

U.S. PATENT DOCUMENTS

| | | | |
|---|---|---|---|
| 2,422,438 A | | 6/1947 | Richards |
| 2,628,590 A | | 2/1953 | Wood |
| 3,086,499 A | | 4/1963 | Dilley |
| 3,760,769 A | | 9/1973 | Erfeling |
| 3,900,006 A | * | 8/1975 | Shockley, Jr. ....... A01K 31/005 119/457 |
| 3,903,851 A | | 9/1975 | Van Huis |
| 4,004,552 A | * | 1/1977 | Levin .................. A01K 41/065 119/322 |
| 4,213,422 A | | 7/1980 | Nagel et al. |
| 4,378,758 A | | 4/1983 | Coleman |
| 4,998,967 A | * | 3/1991 | Box ....................... A01K 31/07 119/489 |
| D318,348 S | | 7/1991 | Meek |
| D343,259 S | | 1/1994 | Kovatch |
| 5,749,323 A | * | 5/1998 | Kleinsasser .......... A01K 1/0151 119/530 |
| D412,604 S | | 8/1999 | Hickey |
| 5,985,336 A | | 11/1999 | Ivey et al. |
| 6,543,387 B1 | | 4/2003 | Stein |
| D600,917 S | | 9/2009 | Meter |
| 8,196,548 B2 | | 6/2012 | Hendel |
| 8,272,352 B2 | | 9/2012 | Hendel |
| 8,904,964 B2 | | 12/2014 | Hendel |
| 9,060,497 B2 * | | 6/2015 | Meter .................... A01K 31/18 |
| 9,119,382 B2 * | | 9/2015 | Foreman ............... A01K 45/005 |
| 9,414,573 B2 * | | 8/2016 | Zanotti ................ A01K 31/002 |
| 9,737,056 B2 * | | 8/2017 | Foreman ............... A01K 45/005 |
| 2009/0283049 A1* | | 11/2009 | Spreitzer .............. A01K 1/0114 119/166 |
| 2010/0186428 A1* | | 7/2010 | Meter .................. A01K 1/0076 62/62 |
| 2013/0125826 A1 | | 5/2013 | Meter |

FOREIGN PATENT DOCUMENTS

| | | |
|---|---|---|
| CN | 2 887 785 Y | 4/2007 |
| DE | 20 2009 003654 U1 | 7/2009 |
| EP | 0 287 824 A1 | 10/1988 |
| EP | 0 867 113 A2 | 9/1998 |
| EP | 1 488 691 A2 | 12/2004 |
| WO | WO 02/39812 A1 | 5/2002 |
| WO | WO 2004/016075 A1 | 2/2004 |
| WO | WO 2005/070198 A1 | 8/2005 |
| WO | WO 2007/110861 A2 | 10/2007 |
| WO | WO 2009/014422 A1 | 1/2009 |
| WO | WO 2014/126466 A1 | 8/2014 |

* cited by examiner

STACKABLE POULTRY CONTAINER SYSTEM AND METHOD

RELATED APPLICATION

The present application claims the benefit under 35 U.S.C. § 119 of U.S. Provisional Patent Application No. 62/166,466, titled STACKABLE POULTRY CONTAINER SYSTEM AND METHOD and filed on May 26, 2015, which is hereby incorporated by reference in its entirety.

A stackable poultry container system is described herein along with methods of using the system in connection with the care of poultry.

The care and feeding of young poultry (e.g., turkey poults, chicks, ducklings, etc.) can present challenges because of the need to provide sanitary spaces where the animals can be kept and where they may also have safe access to feed. This can be particularly challenging if these conditions, i.e., sanitary spaces with access to feed, are to be provided in a manner that also allows for transport of the animals in those spaces.

SUMMARY

Stackable poultry container systems are described herein along with methods of using the systems in connection with the care of poultry.

In one or more embodiments, the stackable poultry container systems described herein may include feeder apparatus that allow for the distribution of feed to all of the containers within a stack of containers through the feeder apparatus provided in the uppermost container in the stack. In other words, delivery of feed into the feeder apparatus of the uppermost container will result in the distribution of the feed to all of the poultry containers within that stack without requiring the user to unstack the poultry containers and/or provide feed separately to the poultry containers within the stack.

In one or more embodiments, the stackable poultry container systems described herein may include a floor that has waste apertures formed therein to allow waste from animals located in the container to fall through the floor to improve sanitation for the animals located in the container system. The size and/or shape of the waste apertures provided in one or more embodiments of the poultry containers described herein may be selected to balance the competing concerns of preventing "hock-lock" (in which a bird, especially a turkey poult, may become trapped in a waste aperture such that the mobility of the bird is limited) and the need to pass waste material out of the container through the waste apertures.

In one or more embodiments, the stacks of poultry containers may include waste shields located beneath each floor such that waste falling through the floor of a container does not pass into the container located below when the containers are stacked on top of each other as described herein. In one or more embodiments, the waste shields may be provided separately from the containers to simplify replacement and/or cleaning of the waste shields and the floors of the containers described herein.

In one or more embodiments of the poultry container systems described herein, the feeder apparatus may be located within the poultry containers such that animals have 360° access to the feeder apparatus which may promote feeding by those animals.

In one or more embodiments of the poultry container systems described herein, the feeder apparatus may include features such as barriers that are configured to reduce the likelihood of animals walking through the feed trays of the feeder apparatus. Reducing passage of animals through the feed trays may reduce the likelihood that waste from the animals will be introduced into the feed located within the feed trays.

In a first aspect, one or more embodiments of a stackable poultry container system as described herein may include a first poultry container and a second poultry container, wherein the first poultry container and the second poultry container each comprise: a floor comprising a top surface, bottom surface and perimeter surrounding the floor; a plurality of waste apertures formed through the floor, wherein each waste aperture of the plurality of waste apertures extends through the floor from a top waste opening at the top surface of the floor to a bottom waste opening at the bottom surface of the floor; and a feeder apparatus located within the perimeter of the floor. In one or more embodiments, the feeder apparatus may include: a feed tray positioned above the top surface of the floor; a feeder column comprising a top opening, a bottom opening and a wall defining a passageway between the top opening and the bottom opening; and a feed aperture in the wall, wherein the feed aperture is located above the feed tray and below the top opening of the feeder column, and wherein the feed aperture is configured to deliver feed into the feed tray when the feeder column is filled with feed to a level at or above the feed aperture. Each of the first and second poultry containers may also include one or more perimeter supports positioned about the perimeter of the floor, wherein the perimeter supports are configured to support the second poultry container above the first poultry container such that the bottom opening of the feeder column of the second poultry container is aligned with the top opening of the feeder column of the first poultry container, wherein feed passing through the passageway of the feeder column of the second poultry container passes into the passageway of the feeder column of the first poultry container through the top opening of the feeder column of the first poultry container.

In one or more embodiments of the poultry containers used in the poultry container systems described herein, the perimeter of the floor comprises a geometric center, and wherein the geometric center is located within the feeder column of the feeder apparatus.

In one or more embodiments of the poultry containers used in the poultry container systems described herein, the perimeter of the floor comprises a geometric center and a minimum cross-floor dimension measured along a straight line passing through the geometric center, and wherein the feeder apparatus comprises an outer perimeter on the floor, and further wherein a minimum passageway distance between the outer perimeter of the feeder apparatus and the perimeter of the floor is 10% or more of the minimum cross-floor dimension.

In one or more embodiments of the poultry container systems described herein, the system further comprises a waste shield located above the top surface of the floor and the feed tray of the first poultry container and below the bottom surface of the floor of the second poultry container, wherein the waste shield is configured to capture waste passing through the waste apertures of the floor of the second poultry container before the waste reaches the top surface of the floor of the first poultry container. In one or more embodiments, the waste shield comprises a feeder column opening configured to allow feed passing through the bottom opening of the feeder column of the second poultry container to pass into the passageway of the feeder column of the first poultry container. In one or more embodiments, the feeder apparatus comprises a waste shield support configured to support the waste shield proximate the feeder column at a position below the top opening of the feeder column and above the feed tray.

In one or more embodiments of the poultry container systems described herein, the first poultry container comprises a wall extending upward from the floor, wherein the wall and floor of the first poultry container, together with the waste shield, define a closed containment volume located between the floor of the first poultry container and the waste shield.

In one or more embodiments of the poultry containers used in the poultry container systems described herein, the bottom waste opening of each waste aperture of the plurality of waste apertures occupies a larger area of the bottom surface of the floor than the area of the top surface of the floor occupied by the top waste opening of each waste aperture of the plurality of waste apertures.

In one or more embodiments of the poultry containers used in the poultry container systems described herein, each waste aperture of the plurality of waste apertures comprises a cross-sectional area measured transverse to an aperture axis extending through the top and bottom waste openings of the waste aperture, wherein the cross-sectional area increases when moving along the aperture axis from the top waste opening towards the bottom waste opening.

In one or more embodiments of the poultry containers used in the poultry container systems described herein, the top waste opening of each waste aperture of the plurality of waste apertures comprises six sides arranged about a center of the top waste opening, and a protrusion extending inwardly towards the center between each pair of adjacent sides. In one or more embodiments, the six sides are arranged in a hexagonal pattern about the center of the top waste opening.

In one or more embodiments of the poultry containers used in the poultry container systems described herein, the feed tray surrounds the feeder column of the feeder apparatus.

In one or more embodiments of the poultry containers used in the poultry container systems described herein, the feeder apparatus comprises a plurality of barriers extending from the feeder column towards an outer perimeter of the feed tray, wherein the feed tray is separated into a plurality of feed tray sections by the plurality of barriers. In one or more embodiments, the feeder apparatus comprises a plurality of feed apertures in the wall of the feeder column, wherein each feed tray section is aligned with one or more of the feed apertures such that feed passing through the one or more feed apertures is delivered into the feed tray section aligned with the one or more feed apertures. In one or more embodiments, the feeder apparatus comprises a feed diverter located between the outer perimeter of the feed tray and the feeder column within each feed tray section, the feed diverter configured to change a direction of travel of at least a portion of feed delivered into the feed tray section from the one or more feed apertures aligned with the feed tray section.

In a second aspect, one or more embodiments of a stackable poultry container system as described herein may include a first poultry container and a second poultry container, wherein the first poultry container and the second poultry container each comprise: a floor comprising a top surface, bottom surface and perimeter surrounding the floor; a plurality of waste apertures formed through the floor, wherein each waste aperture of the plurality of waste apertures extends through the floor from an opening at the top surface of the floor to an opening at the bottom surface of the floor, wherein the bottom opening of each waste aperture of the plurality of waste apertures occupies a larger area of the bottom surface of the floor than the area of the top surface of the floor occupied by the top opening of each waste aperture of the plurality of waste apertures; and one or more perimeter supports positioned about the perimeter of the floor, wherein the perimeter supports are configured to support the second poultry container above the first poultry container.

In one or more embodiments of the poultry containers used in the poultry container systems described herein, each waste aperture of the plurality of waste apertures comprises a cross-sectional area measured transverse to an aperture axis extending through the top and bottom openings of the waste aperture that increases when moving along the aperture axis from the top opening towards the bottom opening.

In one or more embodiments of the poultry containers used in the poultry container systems described herein, the top opening of each waste aperture of the plurality of waste apertures comprises six sides arranged in a hexagonal pattern about a center of the top opening, and a protrusion extending inwardly towards the center between each pair of adjacent sides.

In one or more embodiments of the poultry container systems described herein, the system further comprises a waste shield located above the top surface of the floor of the first poultry container and below the bottom surface of the floor of the second poultry container, wherein the waste shield is configured to capture waste passing through the waste apertures of the floor of the second poultry container before the waste reaches the top surface of the floor of the first poultry container.

In one or more embodiments of the poultry containers used in the poultry container systems described herein, the first and second poultry trays each comprise a feeder apparatus located within the perimeter of the floor.

In a third aspect, one or more embodiments a stackable poultry container system as described herein includes a first poultry container and a second poultry container, wherein the first poultry container and the second poultry container each comprise: a floor comprising a top surface, bottom surface and perimeter surrounding the floor; a plurality of waste apertures formed through the floor, wherein each waste aperture of the plurality of waste apertures extends through the floor from an opening at the top surface of the floor to an opening at the bottom surface of the floor, wherein the top opening of each waste aperture of the plurality of waste apertures comprises six sides arranged in a hexagonal pattern about a center of the top opening, and a protrusion extending inwardly towards the center between each pair of adjacent sides; and one or more perimeter supports positioned about the perimeter of the floor, wherein the perimeter supports are configured to support the second poultry container above the first poultry container.

In one or more embodiments of the poultry containers used in the poultry container systems described herein, each waste aperture of the plurality of waste apertures comprises a cross-sectional area measured transverse to an aperture axis extending through the top and bottom openings of the waste aperture that increases when moving along the aperture axis from the top opening towards the bottom opening.

In one or more embodiments of the poultry container systems described herein, the system further comprises a waste shield located above the top surface of the floor of the first poultry container and below the bottom surface of the floor of the second poultry container, wherein the waste shield is configured to capture waste passing through the waste apertures of the floor of the second poultry container before the waste reaches the top surface of the floor of the first poultry container.

In one or more embodiments of the poultry containers used in the poultry container systems described herein, the first and second poultry trays each comprise a feeder apparatus located within the perimeter of the floor. In one or more embodiments, the feeder apparatus comprises: a feed tray positioned above the top surface of the floor; a feeder column comprising a top opening, a bottom opening and a wall defining a passageway between the top opening and the bottom opening; and a feed aperture in the wall, wherein the feed aperture is located above the feed tray and below the top opening of the feeder column, and wherein the feed aperture is configured to deliver feed into the feed tray when the feeder column is filled with feed to a level at or above the feed aperture; and one or more perimeter supports positioned about the perimeter of the floor, wherein the perimeter supports are configured to support the second poultry container above the first poultry container such that the bottom opening of the feeder column of the second poultry container is aligned with the top opening of the feeder column of the first poultry container, wherein feed passing through the passageway of the feeder column of the second poultry container passes into the passageway of the feeder column of the first poultry container through the top opening of the feeder column of the first poultry container. In one or more embodiments, the feed tray surrounds the feeder column of the feeder apparatus. In one or more embodiments, the feeder apparatus comprises a plurality of barriers extending from the feeder column towards an outer perimeter of the feed tray, wherein the feed tray is separated into a plurality of feed tray sections by the plurality of barriers. In one or more embodiments, the feeder apparatus comprises a plurality of feed apertures in the wall of the feeder column, wherein each feed tray section is aligned with one or more of the feed apertures such that feed passing through the one or more feed apertures is delivered into the feed tray section aligned with the one or more feed apertures. In one or more embodiments, one or more feed tray sections of the plurality of feed tray sections comprises a feed diverter located between the outer perimeter of the feed tray and the feeder column, the feed diverter configured to divert change a direction of travel of at least a portion of feed delivered into the feed tray section from the one or more feed apertures aligned with the feed tray section.

In a fourth aspect, one or more embodiments of a stackable poultry container system as described herein includes a first poultry container and a second poultry container, wherein the first poultry container and the second poultry container each comprise: a floor comprising a top surface, bottom surface and perimeter surrounding the floor; a plurality of waste apertures formed through the floor, wherein each waste aperture of the plurality of waste apertures extends through the floor from a top opening at the top surface of the floor to a bottom opening at the bottom surface of the floor; wherein the top opening of each waste aperture of the plurality of waste apertures is in the form of an inscribed circular opening having a plurality of extension openings extending outwardly from the inscribed circular opening to enlarge a top opening area occupied by the top opening on the top surface of the floor; wherein each extension opening of the plurality of extension openings occupies an extension area on the top surface of the floor that is at least 2% of an inscribed circular opening area occupied by the inscribed circular opening; wherein a sum of all of the extension areas occupied by the plurality of extension areas is no more than 30% of the inscribed circular opening area; and wherein a maximum dimension across each top opening of the plurality of top openings is 15 millimeters or less.

In one or more embodiments of poultry containers of poultry container systems as described herein, the extension area occupied by each extension opening of the plurality of extension openings 10% or less of the inscribed circular opening area occupied by the inscribed circular opening.

In one or more embodiments of the poultry containers used in the poultry container systems described herein, the extension area occupied by each extension opening of the plurality of extension openings is 5% or less of the inscribed circular opening area occupied by the inscribed circular opening.

In one or more embodiments of the poultry containers used in the poultry container systems described herein, the sum of all of the extension areas occupied by the plurality of extension areas is no more than 25% of the inscribed circular opening area.

In one or more embodiments of the poultry containers used in the poultry container systems described herein, the sum of all of the extension areas occupied by the plurality of extension areas is no more than 20% of the inscribed circular opening area.

In one or more embodiments of the poultry containers used in the poultry container systems described herein, the maximum dimension across each top opening of the plurality of top openings is 13 millimeters or less.

In one or more embodiments of the poultry containers used in the poultry container systems described herein, a minimum diameter of the inscribed circular opening of each top opening of the plurality of top openings is 8 millimeters or more.

In one or more embodiments of the poultry containers used in the poultry container systems described herein, a minimum diameter of the inscribed circular opening of each top opening of the plurality of top openings is 10 millimeters or more.

In one or more embodiments of the poultry containers used in the poultry container systems described herein, the plurality of extension openings are arranged in a uniform pattern about the inscribed circular opening.

In one or more embodiments of the poultry containers used in the poultry container systems described herein, a pair of extension openings on opposite sides of a diameter of the inscribed circular opening are symmetrical with each other about an axis of symmetry coincident with the diameter.

In one or more embodiments of the poultry containers used in the poultry container systems described herein, two or more pairs of extension openings on opposite sides of a diameter of the inscribed circular opening are symmetrical with each other about an axis of symmetry coincident with the diameter.

In one or more embodiments of the poultry containers used in the poultry container systems described herein, the plurality of extension openings comprises six extension openings, and wherein the six extension openings are arranged in a hexagonal pattern about a center of the inscribed circular opening.

In one or more embodiments of the poultry containers used in the poultry container systems described herein, each waste aperture of the plurality of waste apertures comprises a cross-sectional area measured transverse to an aperture axis extending through the top and bottom openings of the waste aperture that increases when moving along the aperture axis from the top opening towards the bottom opening.

In one or more embodiments of the poultry container systems described herein, the system further comprises a waste shield located above the top surface of the floor of the first poultry container and below the bottom surface of the floor of the second poultry container, wherein the waste shield is configured to capture waste passing through the waste apertures of the floor of the second poultry container before the waste reaches the top surface of the floor of the first poultry container.

In one or more embodiments of the poultry containers used in the poultry container systems described herein, the first and second poultry trays each comprise a feeder apparatus located within the perimeter of the floor, the feeder apparatus comprising: a feed tray positioned above the top surface of the floor; a feeder column comprising a top opening, a bottom opening and a wall defining a passageway between the top opening and the bottom opening; and a feed aperture in the wall, wherein the feed aperture is located above the feed tray and below the top opening of the feeder column, and wherein the feed aperture is configured to deliver feed into the feed tray when the feeder column is filled with feed to a level at or above the feed aperture; and one or more perimeter supports positioned about the perimeter of the floor, wherein the perimeter supports are configured to support the second poultry container above the first poultry container such that the bottom opening of the feeder column of the second poultry container is aligned with the top opening of the feeder column of the first poultry container, wherein feed passing through the passageway of the feeder column of the second poultry container passes into the passageway of the feeder column of the first poultry container through the top opening of the feeder column of the first poultry container. In one or more embodiments, the perimeter of the floor comprises a geometric center, and wherein the geometric center is located within the feeder column of the feeder apparatus. In one or more embodiments, the perimeter of the floor comprises a geometric center and a minimum cross-floor dimension measured along a straight line passing through the geometric center, and wherein the feeder apparatus comprises an outer perimeter on the floor, and further wherein a minimum passageway distance between the outer perimeter of the feeder apparatus and the perimeter of the floor is 10% or more of the minimum cross-floor dimension.

In one or more embodiments of the poultry container systems described herein, the system further comprises a waste shield located above the top surface of the floor and the feed tray of the first poultry container and below the bottom surface of the floor of the second poultry container, wherein the waste shield is configured to capture waste passing through the waste apertures of the floor of the second poultry container before the waste reaches the top surface of the floor of the first poultry container. In one or more embodiments, the waste shield comprises a feeder column opening configured to allow feed passing through the bottom opening of the feeder column of the second poultry container to pass into the passageway of the feeder column of the first poultry container. In one or more embodiments, the feeder apparatus comprises a waste shield support configured to support the waste shield proximate the feeder column at a position below the top opening of the feeder column and above the feed tray. In one or more embodiments, the first poultry container comprises a wall extending upward from the floor, wherein the wall and floor of the first poultry container, together with the waste shield, define a closed containment volume located between the floor of the first poultry container and the waste shield.

In a fifth aspect, one or more embodiments of the methods described herein may include: placing a bird in a first poultry container as described herein; placing a waste sheet over a portion of the first poultry container after placing the bird in the first poultry container; and stacking a second poultry container as described herein on the first poultry container after placing the waste sheet over a portion of the first poultry container.

In a sixth aspect, one or more embodiments of the methods described herein may include: stacking a second poultry container on a first poultry container, wherein the first poultry container and the second poultry container each comprise: a floor comprising a top surface, bottom surface and perimeter surrounding the floor; a plurality of waste apertures formed through the floor, wherein each waste aperture of the plurality of waste apertures extends through the floor from an opening at the top surface of the floor to an opening at the bottom surface of the floor; and a feeder apparatus located within the perimeter of the floor, the feeder apparatus comprising: a feed tray positioned above the top surface of the floor; a feeder column comprising a top opening, a bottom opening and a wall defining a passageway between the top opening and the bottom opening; and a feed aperture in the wall, wherein the feed aperture is located above the feed tray and below the top opening of the feeder column; one or more perimeter supports positioned about the perimeter of the floor, wherein the perimeter supports are configured to support the second poultry container above the first poultry container such that the bottom opening of the feeder column of the of the second poultry container is aligned with the top opening of the feeder column of the first poultry container. The method may further include delivering feed into the top opening of the feeder column of the second poultry container such that the feed passes into the top opening of the feeder column of the first poultry container through the bottom opening of the feeder column of the second poultry container, and wherein feed is delivered into the top opening of the feeder column of the second poultry container until the feeder columns of the first and second poultry containers are filled with feed above the feed aperture in the feeder column of the second poultry container, wherein a first portion of the feed passes into the feed tray of the feeder apparatus of the first poultry container through the feed aperture in the feeder column of the first poultry container, wherein a second portion of the feed passes into the feed tray of the feeder apparatus of the second poultry container through the feed aperture in the feeder column of the second poultry container, and wherein a third portion of the feed remains in the feeder columns of the first and second poultry apparatus until feed is removed from the feed trays of the first or second poultry containers.

In one or more embodiments of the methods described herein, the method comprises delivering additional feed into the top opening of the feeder column of the second poultry container as the third portion of the feed moves into the feed trays of the first and/or second poultry containers.

In one or more embodiments of the methods described herein, the method comprises placing a waste shield between the floors of the first and second poultry containers, wherein the waste shield is located above the floor of the first poultry container and below the floor of the second poultry container.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

Where used herein, the terms "top" and "bottom" are used for reference relative to each other only and, depending on the orientation of the poultry containers when used, may or may not accurately describe the relative positions of the recited features with respect to the ground.

The above summary is not intended to describe each embodiment or every implementation of the stackable poultry container systems and methods of using the same as described herein. Rather, a more complete understanding of the invention will become apparent and appreciated by reference to the following Description of Illustrative Embodiments and claims in view of the accompanying figures of the drawing.

DESCRIPTION OF ILLUSTRATIVE EMBODIMENTS

Figure 1:
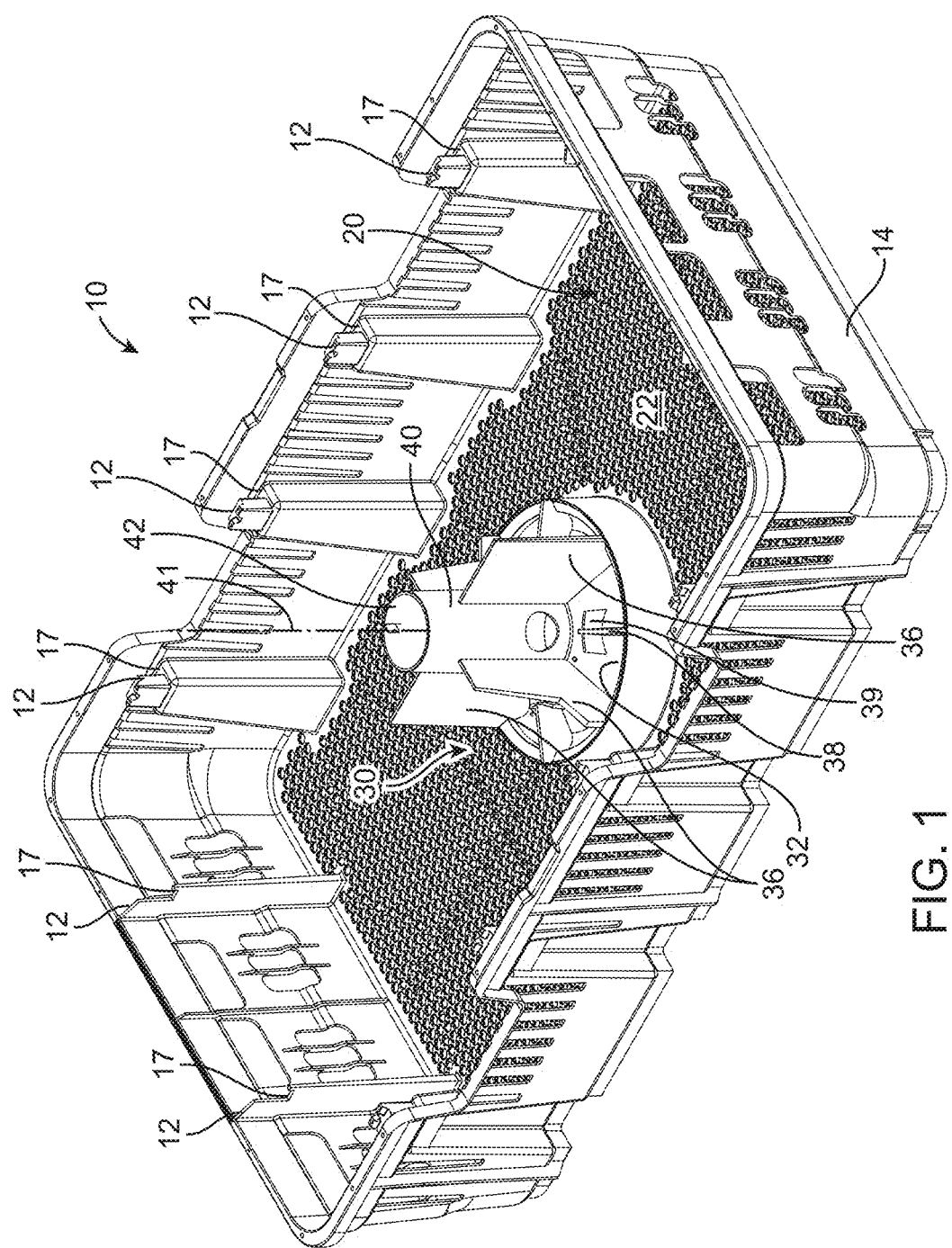
FIG. 1 is a top perspective view of one illustrative embodiment of a stackable poultry container with an optional feeder apparatus as described herein.

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

Figure 2:
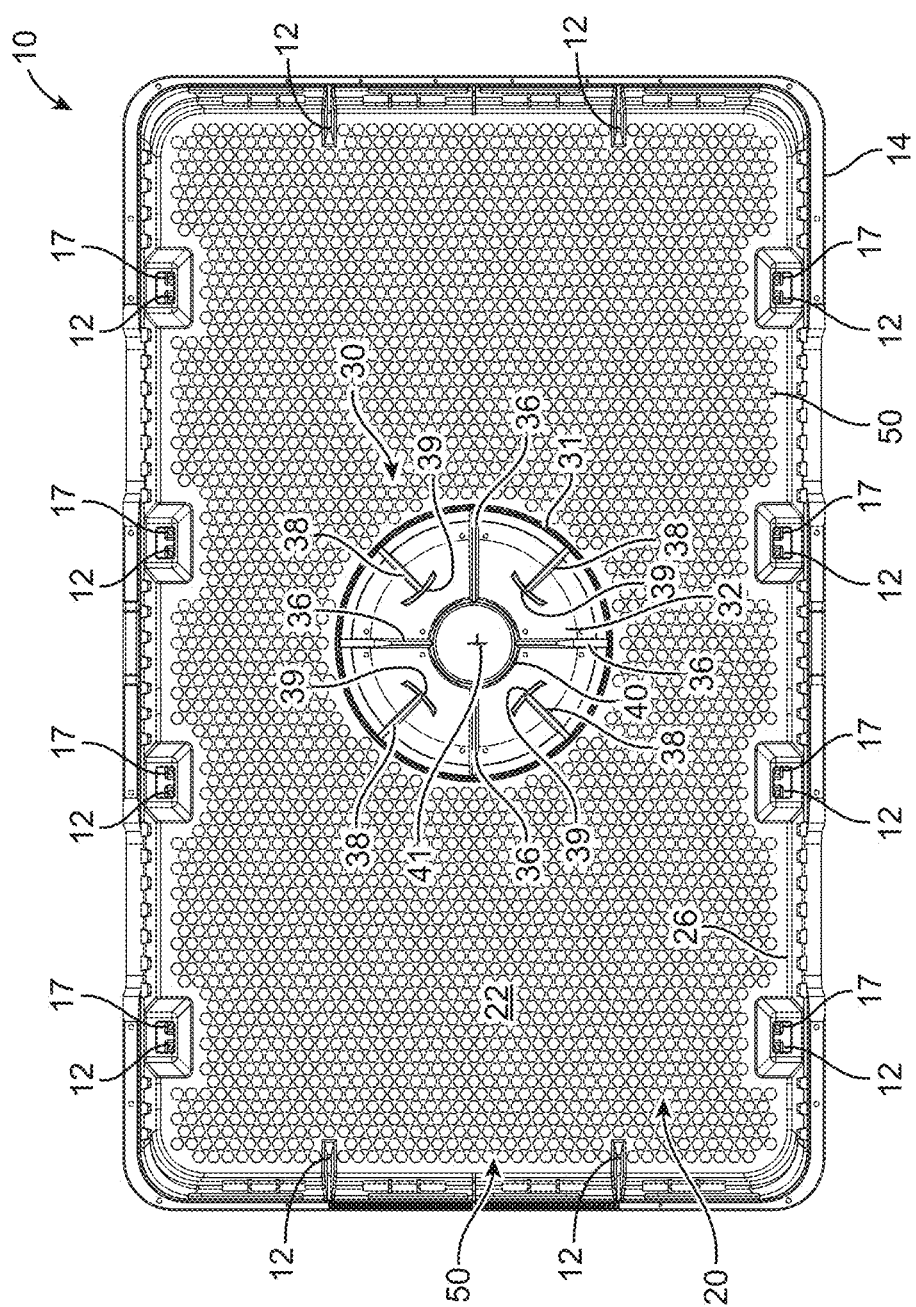
FIG. 2 is a top plan view of the stackable poultry container of FIG. 1.
Figure 3:
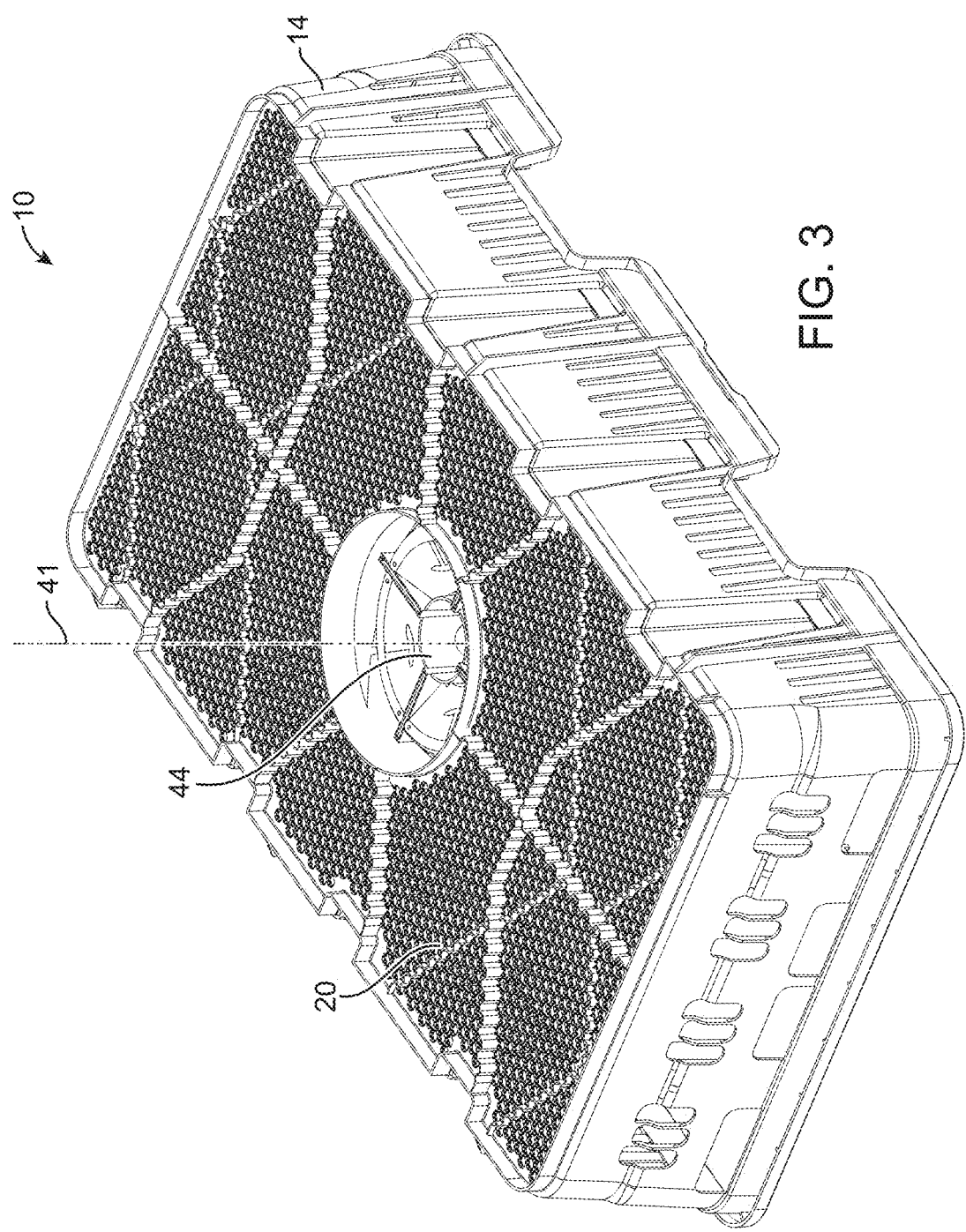
FIG. 3 is a bottom perspective view of the stackable poultry container of FIG. 1.

One illustrative embodiment of a poultry container that may be used in a stackable poultry container system as described herein is depicted in FIGS. 1-3. The poultry container 10 includes a floor 20 having a top surface 22 and a bottom surface 24. The top surface 22 is seen in FIGS. 1 and 2, while the bottom surface 24 is seen in the bottom perspective view of FIG. 3. The floor 20 includes a plurality of waste apertures 50 formed through the floor 20. Each waste aperture 50 extends through the floor 20 from an opening at the top surface 22 of the floor 20 to an opening at the bottom surface 24 of the floor 20. Illustrative examples of waste apertures that may be used in connection with the containers used in the stackable poultry container systems described herein are further described in connection with FIGS. 7-10.

Regardless of the actual form of the waste apertures used in one or more embodiments of poultry containers of the stackable poultry container systems described herein, the waste apertures are preferably sized to allow animal waste to pass through the waste apertures so that a majority of the waste from animals located in the paltry container 10 does not collect on the floor 20 within the poultry container 10. Furthermore, in one or more embodiments, the waste apertures may be sized and shaped to limit the likelihood that an animal located in the poultry container 10 will be trapped by the waste apertures 50. In particular, for example, the waste apertures may, in one or more embodiments, be sized and shaped to limit the occurrence of "hock lock" which may occur when the hock joint of a turkey poult becomes trapped within an opening such as one of the waste apertures 50, thereby limiting mobility of that animal within the container.

One or more embodiments of the poultry containers used in stackable poultry container systems as described herein also includes a feeder apparatus 30. Although the illustrative embodiments of poultry containers depicted herein include only one feeder apparatus 30, alternative embodiments of the poultry containers described herein may include two or more separate feeder apparatus. Furthermore, one or more embodiments of the poultry containers described herein may not include any feeder apparatus.

The feeder apparatus 30 provided in the poultry containers described herein is used to provide feed for animals located within the poultry container 10. In one or more embodiments, the feeder apparatus 30 includes a feed tray 32 which may, in one or more embodiments, be positioned above the top surface 22 of the floor 20 of the poultry container 10.

The feeder apparatus 30 and may further include a feeder column 40 having a top opening 42 and a bottom opening 44, with a wall defining a passageway between the top opening 42 and the bottom opening 44 of the feeder column 40. The passageway through the feeder column 40 may follow along feeder column axis 41. In one or more embodiments, one or more feed apertures 48 may be formed through the wall of the feeder column 40. The feed apertures 48 may, in one or more embodiments, be located above the feed tray 32 and below the top opening 42 of the feeder column 40.

In one or more embodiments, the feeder column 40 and the one or more feed apertures 48 are configured to deliver feed passing through the passageway of the feeder column 40 (from the top opening 42 towards the bottom opening 44)

into the feed tray 32. In one or more embodiments, the feeder column 40 and the one or more feed apertures 48 may be configured to allow feed passing through the feeder column 40 to pass from the top opening 42 to the bottom opening 44. In such an embodiment, the feed that bypasses the feed apertures 48 of the feeder apparatus 30 can be delivered to a feeder apparatus provided in a poultry container located below the poultry container (see, e.g., FIGS. 5-6).

When the feeder column 40 of the lower poultry container of a stacked pair of poultry containers as described herein is filled with feed, then feed will collect in the feeder column 40 of the upper poultry container. When feed collected in the feeder column 40 of the upper poultry container reaches the level of feed apertures 48 in the feeder column 40 of the upper poultry container, then feed passing through the feeder column 40 of the upper poultry container will be diverted into the feed tray 32 of the upper poultry container through feed apertures 48 in the feeder column 40 of the upper poultry container.

In one or more embodiments of the stackable poultry container systems described herein, the lowermost poultry container in a stacked group (e.g., a stack of two, three, four or more stacked poultry containers) may include a cap, plug or other device (not shown) that closes the bottom opening 44 of the feeder column 40 of the lowermost poultry container such that feed passing into the feeder column 40 of the lowermost poultry container is retained within the feeder column 40. In such a lowermost poultry container, feed will be diverted through feed apertures 48 into the feed tray 32 of the feeder column 40 when the feed reaches the level of apertures 48.

As the flow of feed through feed apertures 48 into the feed tray 32 of the lowermost poultry container slows and/or stops as the feed tray 32 is filled with feed, then feed flowing into the feeder column 40 of the lowermost poultry container will fill that feeder column 40. Once the feeder column 40 of the lowermost poultry container is filled with feed, feed flowing into the feeder column 40 of the lowermost poultry container through the feeder column 40 of the upper poultry container will begin to back up into the feeder column 40 of the upper poultry container. This process will continue until all of the feeder columns 40 of poultry containers in a stacked group of poultry containers (and their respective feed trays 32) are filled with feed.

In other words, delivery of feed into the feeder apparatus of the uppermost poultry container will result in the distribution of the feed to all of the poultry containers within that stack without requiring the user to unstack the poultry containers and/or provide feed separately to the poultry containers within the stack. As animals within the poultry containers consume feed in the feed trays, more feed will typically be delivered into the feed trays of all of the poultry containers so long as feed is provided in the feeder column above the feed apertures of the uppermost stacked poultry containers.

The poultry containers used in stackable poultry container systems as described herein also include perimeter supports 12 positioned about the perimeter of the floor 20 of the poultry container 10. The perimeter supports 12 are configured to support a second poultry container above the poultry container 10 depicted in FIGS. 1-3 (see, e.g., FIG. 5). Although the perimeter supports 12 are attached to the wall 14 surrounding the floor 20 of poultry container 10 in the depicted illustrative embodiment, in one or more alternative embodiments, the perimeter supports may or may not be attached to the wall 14.

In one or more embodiments, the perimeter supports 12 are configured such that the stacked poultry containers are supported and arranged such that the bottom opening 44 of the feeder column 40 of the upper poultry container 10 is aligned with the top opening 42 of the feeder column 40 of the lower poultry container 10. Aligning the feeder columns 40 of the feeder apparatus in the stacked poultry containers allows, in one or more embodiments, feed passing through the passageway of the feeder column 40 of the upper poultry container to pass into the passageway of the feeder column 40 of the lower poultry container through the top opening 42 of the feeder column 40 of the lower poultry container 10.

One or more embodiments of the poultry containers described herein may include a feeder apparatus in which the feed tray 32 surrounds the feeder column 40 of the feeder apparatus 30. In other words, the feeder column 40 includes a feed tray 32 that extends 360° around feeder column 40 (see, e.g., FIG. 2).

Figure 4:
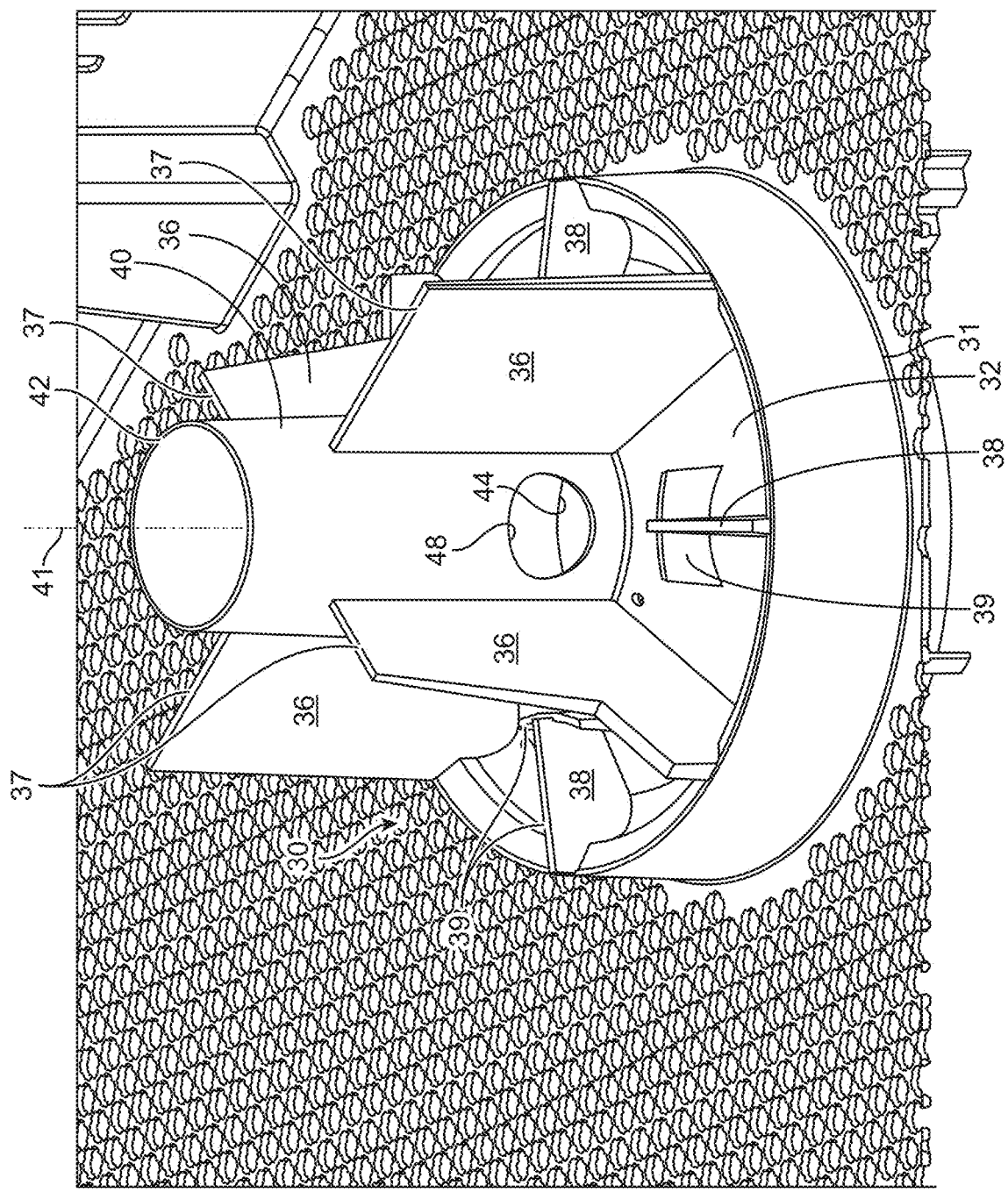
FIG. 4 is an enlarged perspective view of the illustrative embodiment of a feeder used in the illustrative embodiment of the poultry container as depicted in FIG. 1.

With reference to FIGS. 2 and 4, one or more embodiments of the feeder apparatus 30 used in one or more embodiments of the poultry containers described herein may include one or more barriers 36 extending from the feeder column 40 towards an outer perimeter 31 of the feed tray 32. The barriers 36 may separate the feed tray 32 into a plurality of feed tray sections arranged around the feeder column 40. Although described as extending towards the outer perimeter 31 of the feed tray 32, the barriers 36 may or may not extend completely to the outer perimeter 31 of the feed tray 32. Furthermore, although being described as extending from the feeder column 40, the barriers 36 may or may not extend all the way to the feeder column 40. In other words, there may, in one or more embodiments of the feeder apparatus used in poultry containers described herein, be a gap between one or more of the barriers 36 and the feeder column 40.

In one or more embodiments, the barriers 36 may be arranged radially with respect to the feeder column axis 41 extending through the feeder column 40 as depicted in the illustrative embodiment of feeder apparatus 30, although such an arrangement is not required.

Another optional feature depicted in connection with the barriers 36 of the feeder apparatus 30 is that one or more of the barriers 36 may include a top edge 37 positioned to support a waste shield as will be described further herein with respect to, e.g., FIG. 5.

In one or more embodiments of the feeder apparatus 30 used in one or more embodiments of the poultry containers described herein, the feeder apparatus 30 may include two or more feed apertures 48 through which feed passing through the feeder column 40 may be delivered into the feed tray 32. In one or more embodiments, in which the feeder apparatus 30 includes barriers 36 that separate the feed tray 32 into a plurality of feed tray sections, each feed tray section formed by the barriers 36 may be aligned with one or more of the feed apertures 48 such that feed passing through the one or more feed apertures 48 is delivered into the feed tray section aligned with those one or more feed apertures 48.

One or more embodiments of the poultry containers described herein that include feeder apparatus 30 having barriers 36 that separate the feed tray 32 into a plurality of feed tray sections may also include a feed diverter 39 located in one or more of the feed tray sections defined by the barriers 36. The feed diverter 39 may, in one or more embodiments, be configured to change the direction of travel of at least a portion of the feed delivered into the feed tray section in which the diverter 39 is located. For example, the feed diverter 39 may assist in spreading out the feed delivered into a feed tray section through a feed aperture 48 within a given feed tray section In one or more embodiments, the feed diverter 39 may be located between the feeder column 40 and the outer perimeter 31 of the feed tray 32.

In one or more embodiments, the feeder apparatus 30 including a feed diverter 39 may include a feed diverter barrier 38 that extends from the feed diverter 39 to the outer perimeter 31 of the feed tray 32. The feed diverters 39 and corresponding feed diverter barriers 38 may, in one or more embodiments, be located at a midpoint between barriers 36 that define a feed tray section of the feed tray 32, although such an arrangement is not necessarily required. Furthermore, the feed diverter barriers 38 may be arranged radially with respect to a feeder column axis 41 passing through the feeder column 40, although such an arrangement is not required.

As described herein, the barriers 36 extending between the feeder column 40 and the outer perimeter 31 of the feed tray 32 and the feed diverter barriers 38 extending from the feed diverters 39 towards the outer perimeter 31 of the feed tray 32 may separate the feed tray 32 into sections. In one or more embodiments, the different barriers 36 and 38 may also serve to limit the travel of animals through the feed tray 32. Doing so may, in one or more embodiments, limit the contamination of feed with animal waste and may also limit the waste of food that may be pushed or kicked out of the feed tray 32 by an animal passing through the feed tray 32.

Placement of the feeder apparatus in one or more embodiments of the poultry containers described herein may also be adjusted to benefit the welfare of animals located within the poultry container. For example, the feeder apparatus 30 may be located within the perimeter defined by the floor 20 of a poultry container 10 such that animals may have access to the entire perimeter 31 of the feeder apparatus 30. In other words, there may be a passageway between the perimeter 31 of the feeder apparatus 30 and all sides of the floor 20 and any walls located along the perimeter of the floor 20. In one or more embodiments, the feeder apparatus 30 may be described as being located within the perimeter of the floor 20 such that the animals located within the poultry container 10 have 360° access to the perimeter of the feeder apparatus 30.

Another manner of characterizing the location of a poultry feeder apparatus used in one or more embodiments of the poultry containers described herein may be described using the geometric center of the perimeter of the floor 20. For example, the perimeter of the floor 20 defines a geometric center and that geometric center may be located within the boundary of the feeder column 40 of the feeder apparatus 30. In one or more embodiments, the feeder column axis 41 may be centered within the feeder column 40 and may extend through the geometric center of the floor 20 as defined by the perimeter of the floor 20.

The feeder apparatus used in one or more embodiments of the poultry containers described herein may or may not be centered within the perimeter of the floor of the poultry container. One manner in which the location or placement of a feeder apparatus as used in one or more embodiments of the poultry containers described herein may also be based on the geometric center of the floor as defined within the perimeter of the floor. For example, the geometric center of the floor may be used to define a minimum cross-floor dimension that is measured along a straight line passing through the geometric center of the floor 20. The outer perimeter 31 of the feeder apparatus 30 may be located on the floor 20 such that a minimum passageway distance between the outer perimeter 31 of the feeder apparatus 30 and the perimeter of the floor 20 may be 10% or more of the minimum cross floor dimension.

This feature may be described in connection with, e.g., FIG. 2, with the minimum cross floor dimension measured through a straight line extending through the feeder column axis 41 which, in the depicted embodiment, is coincident with the geometric center of the floor 20. With that minimum cross floor dimension established, it can be seen that the minimum passageway distance between the outer perimeter 31 of the feeder apparatus 30 and the outer perimeter of the floor 20 is greater than 10% of the minimum cross floor dimension.

Figure 5:
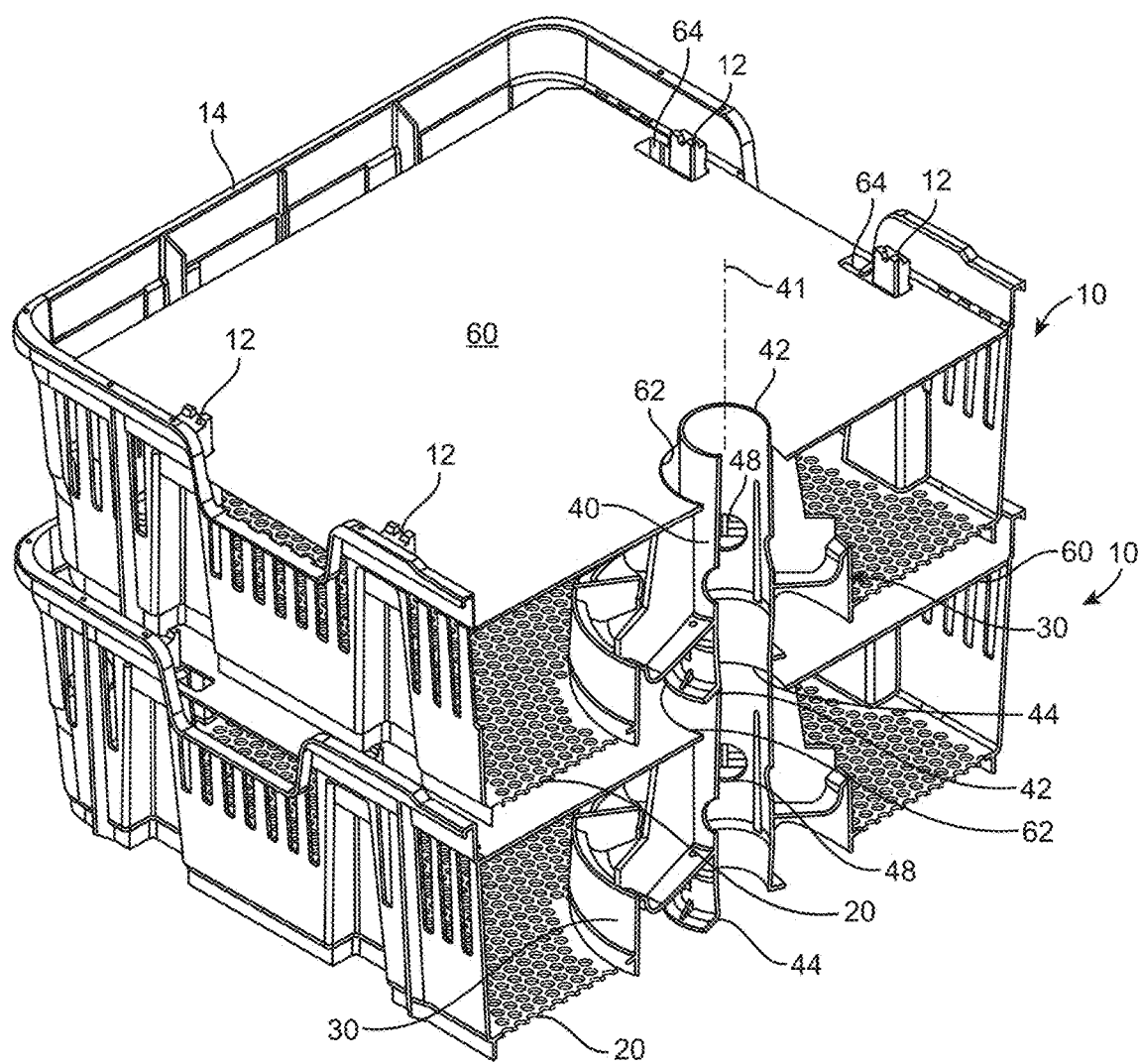
FIG. 5 is a perspective view in cross-section of two stackable poultry containers in a stacked configuration with waste shields in position on both containers.
Figure 6:
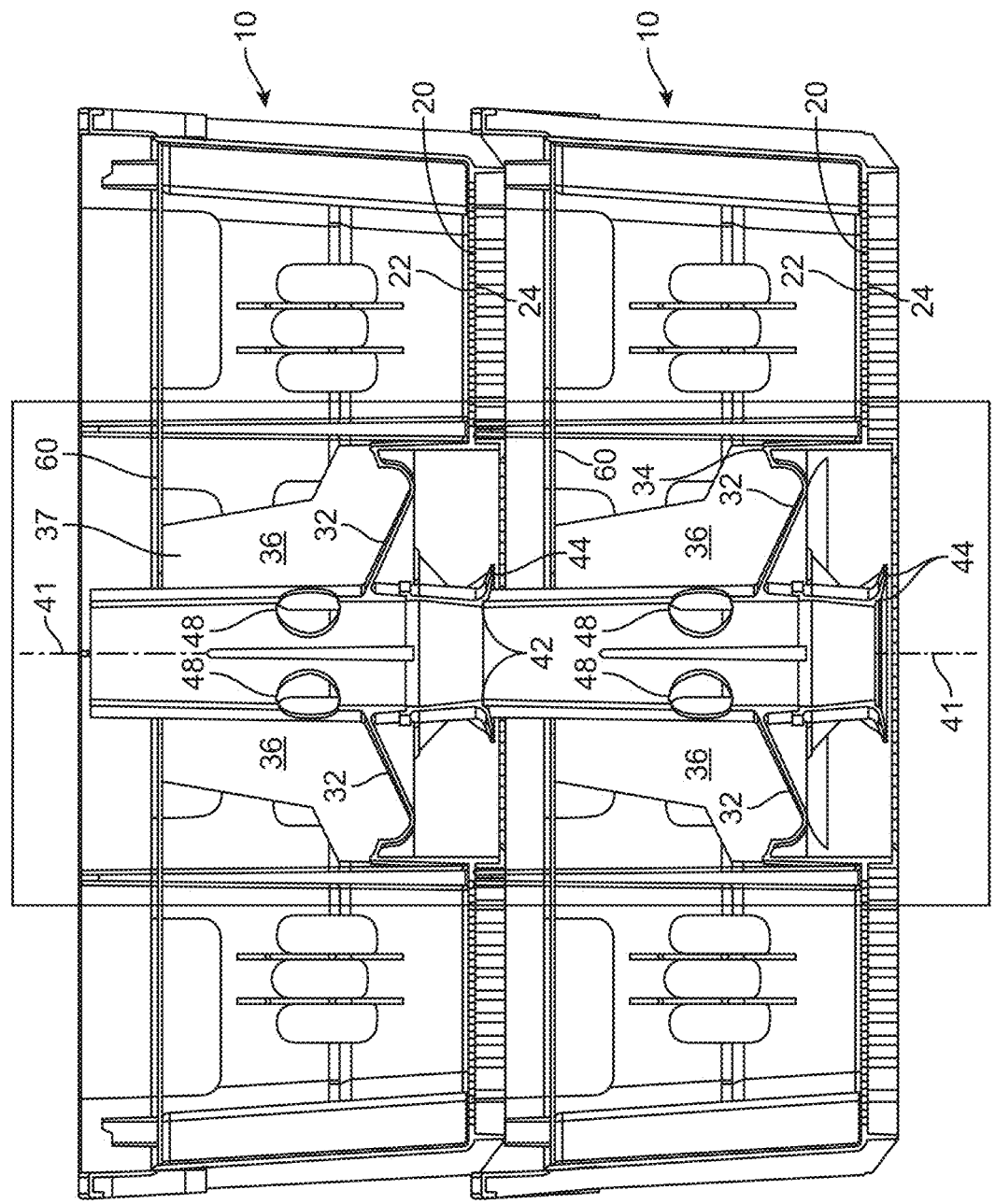
FIG. 6 is an enlarged cross-sectional view of the feeders in the stacked containers of FIG. 5.

Additional optional features of one or more embodiments of poultry containers and stackable poultry container systems as described herein may be depicted in connection with FIGS. 5 and 6. One such optional feature is a waste shield 60 that, as depicted in connection with the illustrative embodiment of FIGS. 5 and 6, is located above the top surface 22 of the floor 20 and the feed tray 32 of the feeder apparatus 30 of the lower poultry container 10 and below the bottom surface 24 of the floor 20 of the upper poultry container 10. A second waste shield 60 is depicted in FIG. 5 above the top surface 22 of the floor 20 of the upper poultry container 10.

In one or more embodiments, the waste shields used in connection with the stackable poultry containers described herein are configured to capture waste passing through the waste apertures of the floor 20 of the upper poultry container 10 before the waste reaches the top surface 22 of the floor 20 of the lower poultry container 10. The waste shields used in connection with stackable poultry containers as described herein may, in one or more embodiments, be constructed of a variety of materials. In one or more embodiments, the waste shields may be constructed of water impermeable material to limit the passage of liquids between the poultry containers. In one or more alternative embodiments, the waste shield may incorporate materials to limit bacteria growth, etc. In one or more embodiments, the waste shield may be constructed of biodegradable materials (e.g., paperboard, cardboard, etc.) with a coating that resists penetration of moisture into the waste shield. In one or more embodiments, the waste shield may have a uniform color such as, e.g., white to reflect light and limit any visual distractions to animals located within the poultry containers.

In one or more embodiments, the waste shields used in connection with the stackable poultry containers described herein may include a feeder column opening 62 that is configured to allow feed passing through the bottom opening 44 of the feeder column 40 of the upper poultry container 10 to pass into the passageway of the feeder column 40 of the lower poultry container 10.

In those embodiments of stackable poultry containers as described herein that include feeder apparatus such as, for example, illustrative feeder apparatus 30, the feeder apparatus 30 may include a waste shield support configured to provide support to a waste shield 60 proximate the feeder column 40. That support may, in one or more embodiments, preferably be provided at a position below the top opening 42 of the feeder column 40 and above the feed tray 32. In the depicted illustrative embodiment of feeder apparatus 30, the upper edges 37 of the barriers 36 of the feeder apparatus 30 provide support to the waste shield 60 located between the upper and lower poultry containers 10 as depicted in FIGS. 5 and 6.

In one or more embodiments, the waste shields used in connection with the poultry container systems described herein may be supported at or near the perimeter of the poultry containers. In the illustrative embodiment depicted in FIGS. 5 and 6, the one or more perimeter supports 12 may be used to support the waste shield 60 around the perimeter of the poultry container 10. The perimeter supports 12 extend through openings 64 in the waste shield 60 in the depicted illustrative embodiment. Perimeter support of waste shields used in connection with the poultry container systems described herein may be provided by any number of alternative structures.

Although depicted in the illustrative embodiments as being discrete structures placed around the perimeter of the poultry containers, one or more alternative embodiments of the one or more perimeter supports used in poultry containers as described herein may be in the form of, e.g., a ledge or other support structure that extends continuously around the perimeter of the poultry container and is configured to support one poultry container above another as described herein.

In addition, one or more embodiments of the poultry containers described herein may include feeder apparatus that also provide support for an upper poultry container located above another poultry container. In connection with the illustrative embodiment of poultry containers 10, the feeder apparatus 30 may include one or more features that provide support to another poultry container stacked on the lower poultry container 10. In one or more embodiments, that support may be provided at least in part by the feeder column 40 (with, e.g., the top opening 42 of the feeder column 40 supporting the bottom opening 44 of the feeder column 40 of the upper poultry container 10).

As described herein, one or more embodiments of the poultry containers described herein may include a wall 14 extending upward from the floor 20 of the container 10. When assembled together, the wall 14 and floor 20 of the poultry container 10, together with the waste shield 60, define a closed containment volume located between the floor 20 of the poultry container 10 and the waste shield 60. Although described as a closed containment volume, it will be understood that the volume defined by the floor 20, walls 14 and waste shield 60 is not a sealed volume, i.e., numerous apertures in openings allow access to the closed containment volume. The closed containment volume is, however, sufficiently enclosed to limit the escape of animals located within the closed containment volume.

Figure 7:
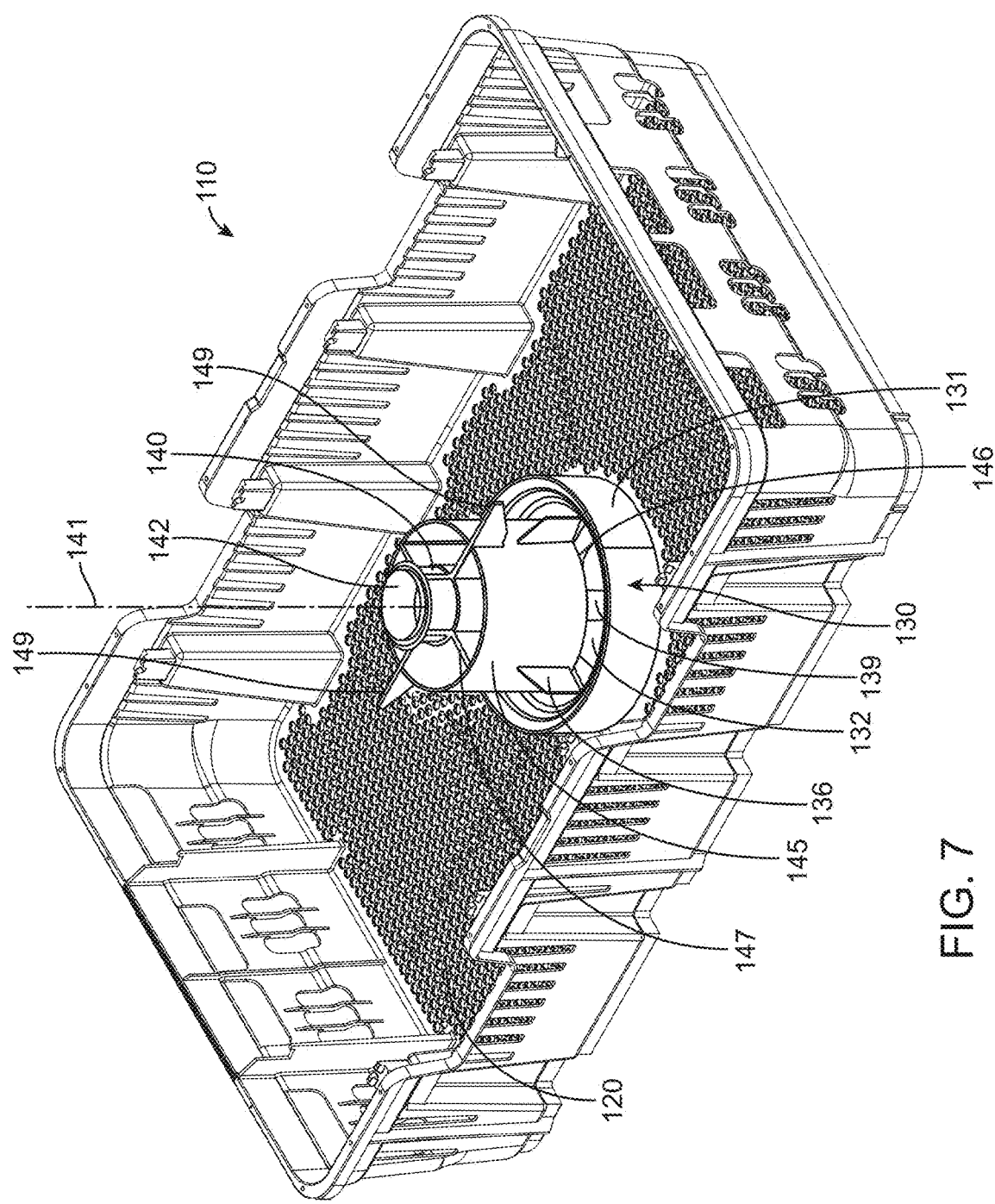
FIG. 7 is a top perspective view of another illustrative embodiment of a stackable poultry container with one alternative embodiment of an optional feeder apparatus as described herein.
Figure 8:
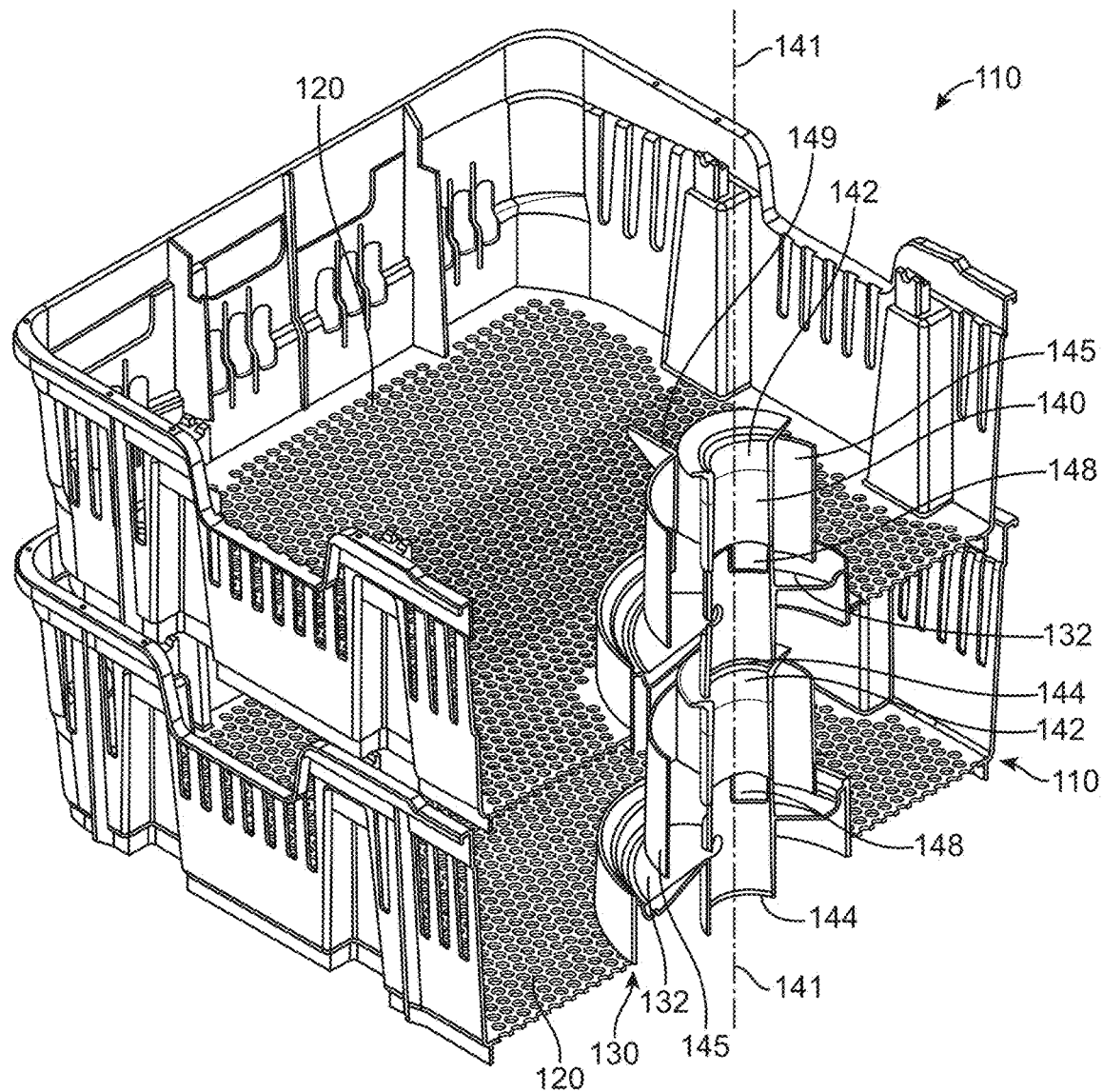
FIG. 8 is a perspective view in cross-section of two stackable poultry containers of FIG. 7 in a stacked configuration (with no waste shields present as in FIG. 5).

One alternative illustrative embodiment of a poultry container that may be used in a stackable poultry container system as described herein is depicted in FIGS. 7-8. The alternative illustrative embodiment of poultry container 110 includes a floor 120 with a plurality waste apertures as described herein. The illustrative embodiment of poultry container 110 also includes a feeder apparatus 130. As described herein, although only one feeder apparatus 130 is depicted in poultry container 110, alternative embodiments of the poultry containers described herein may include two or more separate feeder apparatus.

The feeder apparatus 130 provided in the illustrative embodiment of poultry container 110 is used to provide feed for animals located within the poultry container 110. In one or more embodiments, the feeder apparatus 130 includes a feed tray 132 located within an outer perimeter 131 and the feed tray 132 may, in one or more embodiments, be positioned above the top surface of the floor 120 of the poultry container 110.

The feeder apparatus 130 and may further include a feeder column 140 having a top opening 142 and a bottom opening 144, with a wall defining a passageway between the top opening 142 and the bottom opening 144 of the feeder column 140. The passageway through the feeder column 140 may follow along feeder column axis 141. In one or more embodiments, one or more feed apertures 148 (see, e.g., FIG. 8), may be formed through the wall of the feeder column 140. The feed apertures 148 may, in one or more embodiments, be located above the feed tray 132 and below the top opening 142 of the feeder column 140.

In one or more embodiments, the feeder column 140 and the one or more feed apertures 148 are configured to deliver feed passing through the passageway of the feeder column 140 (from the top opening 142 towards the bottom opening 144) into the feed tray 132. In one or more embodiments, the feeder column 140 and the one or more feed apertures 148 may be configured to allow feed passing through the feeder column 140 to pass from the top opening 142 to the bottom opening 144. In such an embodiment, the feed that bypasses the feed apertures 148 of the feeder apparatus 130 can be delivered to a feeder apparatus provided in a poultry container located below the poultry container (see, e.g., FIG. 8).

When the feeder column 140 of the lower poultry container of a stacked pair of poultry containers as described herein is filled with feed, then feed will collect in the feeder column 140 of the upper poultry container. When feed collected in the feeder column 140 of the upper poultry container reaches the level of feed apertures 148 in the feeder column 140 of the upper poultry container, then feed passing through the feeder column 140 of the upper poultry container will be diverted into the feed tray 132 of the upper poultry container through feed apertures 148 in the feeder column 140 of the upper poultry container.

In one or more embodiments of the stackable poultry container systems described herein, the lowermost poultry container in a stacked group (e.g., a stack of two, three, four or more stacked poultry containers) may include a cap, plug or other device (not shown) that closes the bottom opening 144 of the feeder column 140 of the lowermost poultry container such that feed passing into the feeder column 140 of the lowermost poultry container is retained within the feeder column 140. In such a lowermost poultry container, feed will be diverted through feed apertures 148 into the feed tray 132 of the feeder column 140 when the feed reaches the level of apertures 148.

As the flow of feed through feed apertures 148 into the feed tray 132 of the lowermost poultry container slows and/or stops as the feed tray 132 in the lowermost poultry container is filled with feed, then feed flowing into the feeder column 140 of the lowermost poultry container will fill that feeder column 140. Once the feeder column 140 of the lowermost poultry container is filled with feed, feed flowing into the feeder column 140 of the lowermost poultry container through the feeder column 140 of the upper poultry container will begin to back up into the feeder column 140 of the upper poultry container. This process will continue until all of the feeder columns of poultry containers (and their respective feed trays 132) in a stacked group of poultry containers are filled with feed. Furthermore, as animals within the poultry containers consume feed, more feed will be delivered into the feed trays of the poultry containers so long as feed is provided in the feeder columns of the stacked poultry containers.

Placement of the feeder apparatus in one or more embodiments of the poultry containers described herein may also be adjusted to benefit the welfare of animals located within the poultry containers. The various alternatives for placement of feeder apparatus in poultry containers as discussed above in connection with the illustrative embodiment of poultry containers depicted in FIGS. 1-6 apply equally to the placement of feeder apparatus 130 and its outer perimeter 131 in the alternative illustrative embodiment of poultry containers 110 as depicted in FIGS. 7 and 8.

The feeder apparatus 130 of the illustrative embodiment of poultry container 110 depicted in FIGS. 7-8 also includes an optional outer ring 145 located outside of the feeder column 140 to limit or prevent birds from occupying the feed tray 132 by reducing the depth of the feed tray 132 between the outer perimeter 131 of the feeder apparatus 130 and the outer ring 145. In one or more embodiments, the outer ring 145 may have a lower edge 146 positioned above the feed tray 132 such that feed exiting the feeder column 140 through feed apertures 148 can pass beneath the lower edge 146 of the outer ring 145. In one or more embodiments, the outer ring 145 may be supported by ribs 147 extending outwardly from the feeder column 140.

The depicted illustrative embodiment of feeder apparatus 130 includes a feed diverter 139 that extends downwardly from the lower edge 146 of the outer ring 145 towards the feed tray 132. The feed diverter 139 can, in one or more embodiments, help to distribute feed passing into the feed tray 132 more evenly. In one or more embodiments, the feed diverters 139 may be aligned with the feed apertures 148, e.g., the feed diverters 139 and feed apertures 148 may be radially aligned from the feeder column axis 141. In one or more embodiments, the feed diverters 139 may extend over the entire distance from the lower edge 146 of the outer ring 145 to the feed tray 132. In one or more alternative embodiments, the feed diverters 139 may not occupy the entire distance between the lower edge 146 of the outer ring 145 and the feed tray 132. Further, in one or more alternative embodiments, the feed diverters 139 may extend upwardly from the feed tray 132 in place of or in addition to extending downwardly from the outer ring 145.

The depicted illustrative embodiment of feeder apparatus 130 also includes optional barriers 136 that separate the feed tray 132 into a plurality of feed tray sections outside of the outer ring 145. In one or more embodiments, the feed diverters 139 may be located between adjacent pairs of barriers 136 such that feed delivered into each of the feed tray sections defined by the barriers 136 may be more evenly distributed within each of the feed tray sections. The feed diverters 139, in one or more embodiments, be located at a midpoint between barriers 136 that define the feed tray sections of the feed tray 132, although such an arrangement is not necessarily required.

As described herein, the barriers 136 may separate the feed tray 132 into sections. In one or more embodiments, the barriers 136 may also serve to limit the travel of animals through the feed tray 132. Doing so may, in one or more embodiments, limit the contamination of feed with animal waste and may also limit the waste of food that may be pushed or kicked out of the feed tray 132 by an animal passing through the feed tray 132. In one or more embodiments, the barriers 136 may extend up the side of the outer ring 145 in addition to being located within the feed tray 132 and extending the barriers 136 above the feed tray 132 may further assist in limiting the passage of animals through the feed tray 132.

As described herein, one or more embodiments of the stackable poultry container systems described herein may include waste shields that can be positioned between adjacent pairs of poultry containers when stacked together to, e.g., limit the passage of waste products from an upper poultry container into a lower poultry container. The outer ring 145 and its support ribs 147 may assist in supporting a waste shield above the floor 120 of poultry container 110. Furthermore, in one or more embodiments, additional waste shield supports 149 may be provided that extend outwardly from the outer ring 145 two provide additional support to a waste shield located above the outer ring 145.

As discussed herein, one or more embodiments of the poultry containers of the poultry container systems described herein include a plurality of waste apertures formed through the floor of each of the poultry containers. The waste apertures are provided to allow waste from animals contained in the poultry containers to pass through the floor to improve conditions for the animals within the poultry containers themselves. Although the waste apertures may take many different forms, one illustrative embodiment of waste apertures that may be useful in connection with the poultry containers described herein are depicted in an enlarged format in FIGS. 9-11.

Figure 9:
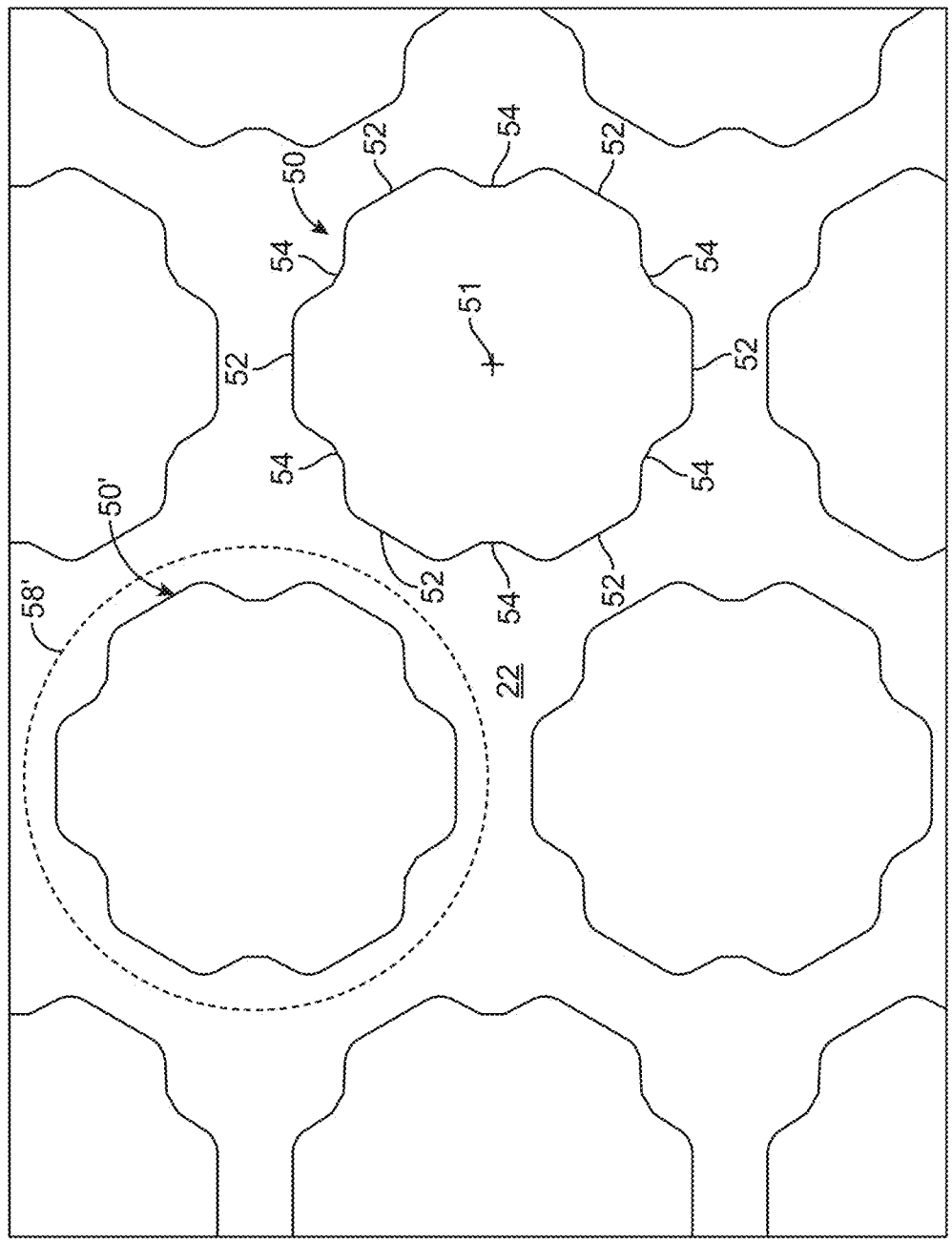
FIG. 9 is an enlarged top plan view of a portion of the container floor including one illustrative embodiment of waste apertures that may be used in connection with the illustrative embodiment of container 10 as depicted in FIGS. 1-3.
Figure 10:
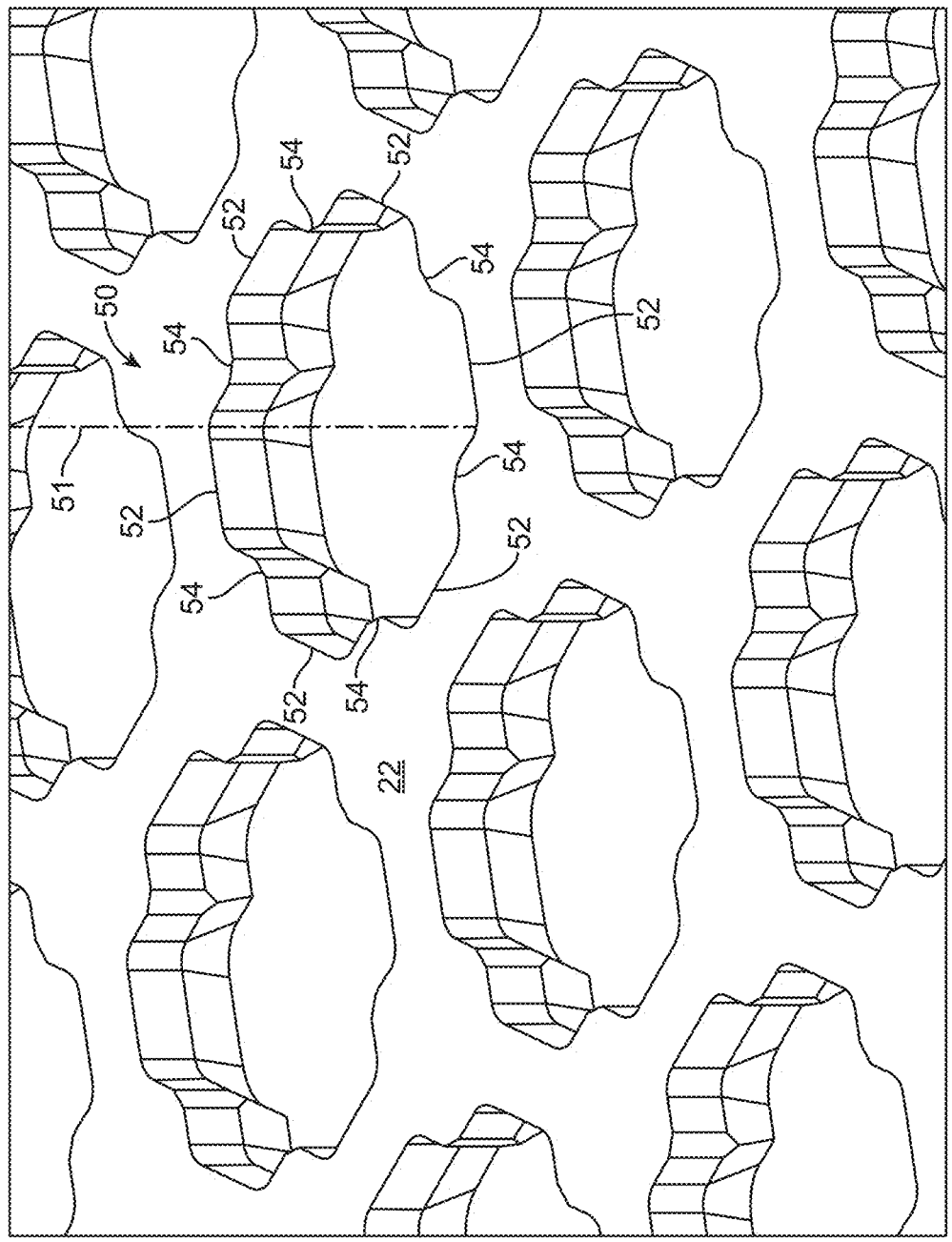
FIG. 10 is an enlarged top perspective view of the portion of the container floor depicted in FIG. 9.
Figure 11:
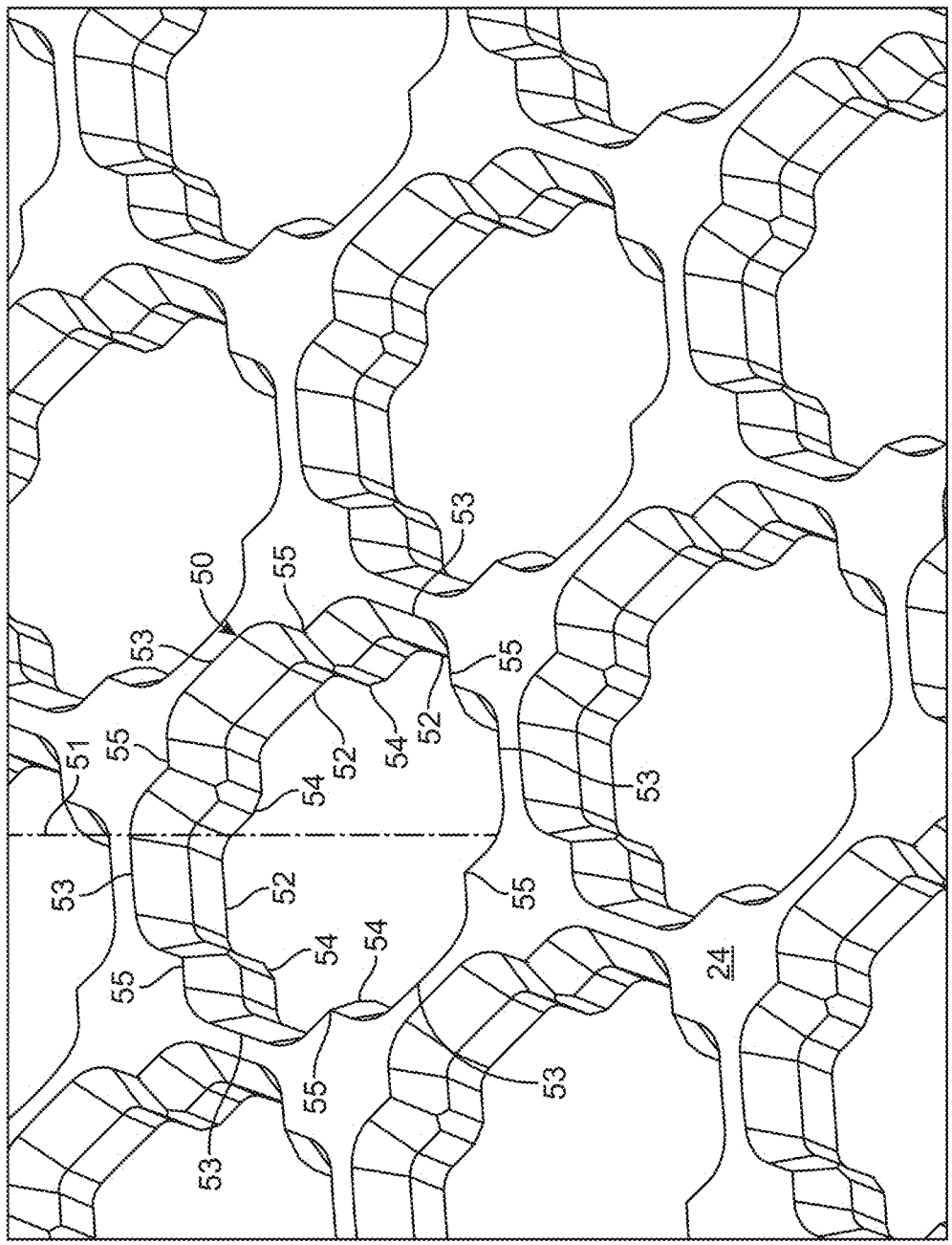
FIG. 11 is an enlarged bottom perspective view of the portion of the container floor depicted in FIGS. 9 and 10.

In the illustrative embodiment of waste apertures 50 as depicted in FIGS. 9-11, the feed waste apertures have a top surface opening formed in the top surface 22 of the floor 20 of a poultry container (see, e.g., FIG. 9) and a bottom surface opening formed in the bottom surface 24 of the floor 20 of a poultry container (see, e.g., FIG. 11). In one or more embodiments of poultry containers as described herein, the bottom waste openings of the waste apertures 50 occupy a larger area on the bottom surface 24 of the floor 20 than the area occupied by the top waste openings on the top surface 22 of the floor 20. Another manner of characterizing the increasing size of the waste apertures formed in floors of one or more embodiments of poultry containers as described herein may be described with reference to the cross-sectional area of the waste apertures. For example, in one or more embodiments, the waste aperture 50 may be described as having a cross-sectional area measured transverse to an aperture axis 51 extending through the top and bottom waste openings of the waste aperture 50. That cross-sectional area may, in one or more embodiments, increase when moving along the aperture axis 51 from the top waste opening at the top surface 22 of the floor towards the bottom waste opening at the bottom surface 24 floor. In one or more embodiments, the aperture axis 51 may be described as oriented normal or orthogonal to the top surface 22 of the floor of a poultry container as described herein.

The increasing size of the waste apertures used in one or more embodiments of poultry containers as described herein may limit the build-up of waste within a waste aperture 50 as the waste falls through the waste aperture 50.

Although the bottom waste opening and the top waste opening of one or more embodiments of waste apertures 50 used in poultry containers as described herein may have the same geometric shape (with the bottom waste opening simply be larger than the top waste opening), in one or more alternative embodiments, the top waste opening and the bottom waste opening may have different shapes. One example of such an embodiment is depicted in connection with waste aperture 50' as seen in FIG. 9. The waste aperture 50' has a shape similar to that of waste aperture 50. However, the bottom waste opening, which is depicted by broken line 58' because it is not visible in the view of FIG. 9, has a different shape than that of the top waste opening. In particular, the depicted embodiment of waste aperture 50' includes a bottom waste opening 58' in the form of a generally circular shape. Other variations in the shapes of the top and bottom waste openings may be used in the waste apertures of poultry containers as described herein.

With respect to the illustrative embodiment of waste aperture 50, the top waste opening formed in the top surface 22 of the floor of a poultry container may include six sides 52 are arranged about a center of the opening that is, in the depicted embodiment, coincident with aperture axis 51. In one or more embodiments, the sides 52 may be arranged in a hexagonal pattern as seen in FIGS. 9-11, although such an arrangement is not necessarily required. In addition to the sides 52, the depicted embodiment of waste apertures 50 include protrusions 54 that extend inwardly toward the center 51 of the top opening of the waste aperture 50. The protrusions 54 are, in one or more embodiments such as the illustrative embodiment depicted in FIGS. 9-10, located between each pair of adjacent sides 52.

In one or more embodiments, waste apertures used in connection with the poultry containers described herein may include a bottom waste opening that has a shape similar to that of the top waste opening. With reference to FIG. 11, the bottom waste opening of waste aperture 50 includes sides 53 that are also arranged in a generally regular hexagonal pattern along with protrusions 55 that extend inwardly toward a center of the bottom waste opening from the junction between each pair of adjacent sides 53.

Waste apertures 50 having at least a top surface opening in the top surface 22 of the floor of a poultry container as described herein that is in the form of a generally hexagonal shape with protrusions as described herein may limit the occurrence of "hock lock" which may occur when the hock joint of a turkey poult becomes trapped within an opening such as one of the waste apertures 50, thereby limiting mobility of that animal within the container. In one or more embodiments, the protrusions 54 provided in one or more embodiments of waste apertures 50 may be described as decreasing what would otherwise be the largest cross-sectional distance of each waste aperture 50 (if, e.g., the sides 52 of the waste apertures 50 were to extend towards each other to form a regular hexagon in the absence of protrusions 54). Such reduced cross-sectional distances may assist in preventing or reducing "hock lock" as described herein.

In addition to potentially reducing hock-lock, one or more embodiments of the waste apertures described herein may not unnecessarily limit the passage of waste from animals located within the container so that an acceptable amount of waste is retained in the container and that an acceptable number of the waste apertures remain open so that waste can pass through them.

The shape and/or size of one or more embodiments of the waste apertures used in one or more embodiments of the poultry containers described herein may differ from the illustrative embodiment depicted in FIGS. 9-11. Furthermore, the waste apertures that may be useful in balancing the competing issues of controlling hock-lock and waste passage may be characterized in a variety of manners other than those discussed above with respect to the waste apertures depicted in FIGS. 9-11.

Figure 12:
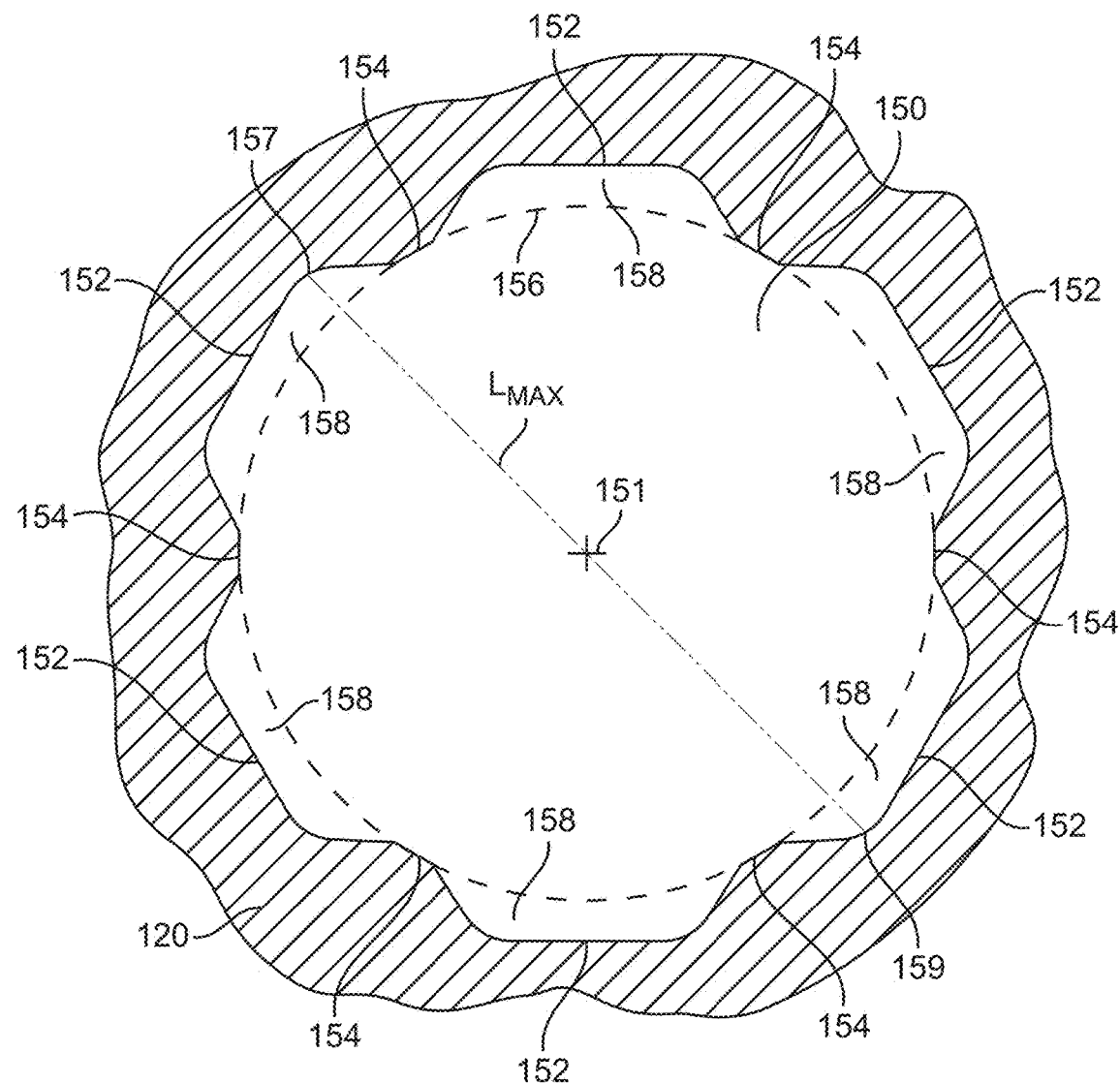
FIG. 12 is an enlarged view of one alternative embodiment of a top opening of a waste aperture that may be used in the floor of one or more embodiments of the poultry containers described herein.

For example, one illustrative embodiment of a top opening of a waste aperture that may be used in one or more embodiments of a poultry container as described herein is depicted in FIG. 12. The waste aperture 150 can also be described as including sides 152 arranged about a center of the opening 150 that is, in the depicted embodiment, coincident with an aperture axis 151. In one or more embodiments, the sides 152 may be arranged in a hexagonal pattern, although such an arrangement is not required. In addition to the sides 152, the depicted embodiment of waste aperture 150 include protrusions 154 that extend inwardly toward the center 151 of the top opening of the waste aperture 150. The protrusions 154 are, in one or more embodiments such as the illustrative embodiment depicted in FIG. 12, located between each pair of adjacent sides 152.

Although the top opening of the waste aperture 150 can be described in terms of sides and protrusions, the shape and/or size of the illustrative embodiment of the top opening of the waste aperture 150 depicted in FIG. 12 may alternatively be described as being in the form of an inscribed circular opening having a plurality of extension openings extending outwardly from the inscribed circular opening to enlarge a top opening area occupied by the top opening of the waste aperture 150 on the top surface of the floor 120 of one or more embodiments of a poultry container as described herein. With reference to FIG. 12, the inscribed circular opening of the top opening of the waste aperture 150 is defined by the largest inscribed circle 156 (having a center at, e.g., 151) that fits within the protrusions 154. The area of the top opening of the waste aperture 150 is further defined by the extension openings 158 that extend outwardly from the inscribed circle 156 (e.g., radially away from the center 151) to enlarge the size/area of the top opening of the waste aperture 150.

In one or more embodiments, the top opening of the waste apertures of one or more embodiments of the poultry containers described herein can be characterized as follows: the extension openings 158 occupy an extension area on the top surface of the floor 120 that is at least 2% of the area of the largest inscribed circle 156 that fits within the top opening of the waste aperture 150, the sum of the extension areas occupied by the extension openings 158 is no more than 30% of the area of the inscribed circle 156 that fits within the top opening of the waste aperture 150, and/or a maximum dimension across the top opening of the waste aperture 150 is 15 millimeters or less.

As described herein, the maximum dimension across the top opening of the waste apertures is measured along any straight line extending across the top opening of the waste aperture on a plane (or nearly planar surface) defined by the top surface of the floor 120 in which the waste apertures 150 are located. In the illustrative embodiment depicted in FIG. 12, the maximum dimension Lmax across the top opening of the waste aperture 150 extends between points 157 and 159 located in extension areas 158 on opposite sides of the top opening of the waste aperture 150. In one or more embodiments, the maximum dimension Lmax may extend through the center 151 of the inscribed circle 156 located in the top opening of the waste aperture 150, but in one or more alternative embodiments, the maximum dimension Lmax may or may not pass through the center 151.

In one or more embodiments of the top opening of the waste apertures used in poultry containers as described herein, the maximum dimension Lmax across the top opening of the waste aperture 150 may be 15 millimeters or less as described above. In one or more alternative embodiments of the top opening of the waste apertures used in poultry containers as described herein, the maximum dimension Lmax across the top opening of the waste aperture 150 may be 13 millimeters or less.

In one or more embodiments of the top opening of the waste apertures used in poultry containers as described herein, a minimum diameter of the inscribed circular opening of each top opening of the waste apertures may be 8 millimeters or more. In one or more alternative embodiments of the top opening of the waste apertures used in poultry containers as described herein, a minimum diameter of the inscribed circular opening of each top opening of the waste apertures may be 10 millimeters or more. In the illustrative embodiment of waste aperture 150 depicted in FIG. 12, the minimum diameter is defined by any opposing pair of protrusions 154 because of the specific geometry of that illustrative embodiment—such an arrangement is not, however, required of all embodiments of waste apertures used in poultry containers as described herein.

In one or more embodiments of the top opening of the waste apertures used in poultry containers as described herein, the extension area occupied by each extension opening 158 may be 10% or less of the area of the largest inscribed circle 156 that fits within the top opening of the waste aperture 150. In one or more alternative embodiments of the top opening of the waste apertures used in poultry containers as described herein, the extension area occupied by each extension opening 158 may be 5% or less of the area of the largest inscribed circle 156 that fits within the top opening of the waste aperture 150.

In one or more embodiments of the top opening of the waste apertures used in poultry containers as described herein, the sum of the extension areas occupied by all of the extension openings 158 extending outward from the largest inscribed circle 156 is no more than 25% of the area of the largest inscribed circle 156 that fits within the top opening of the waste aperture 150. In one or more alternative embodiments of the top opening of the waste apertures used in poultry containers as described herein, the sum of all of the extension areas of the extension openings 158 extending outward from the largest inscribed circle 156 is no more than 20% of the area of the largest inscribed circle 156 that fits within the top opening of the waste aperture 150.

In one or more embodiments of waste apertures as used in poultry containers as described herein, the top openings of the waste apertures may be generally described as being in the form of an inscribed circular opening having two or more extension openings extending outward from the inscribed circular opening as described above in connection with the illustrative embodiment of waste aperture 150 (and also seen in waste apertures 50). In one or more embodiments, such as the illustrative embodiment of waste opening 150, the extension openings 158 may be arranged in a uniform pattern about the inscribed circular opening (defined in the depicted illustrative embodiment by inscribed circle 156). By uniform pattern, it is meant that the extension openings 158 have a uniform size, shape and distribution around the inscribed circle 156.

In one or more alternative embodiments of waste apertures as described herein, however, the top openings of the waste apertures may include two or more extension openings that are not uniform in size, shape, and/or distribution around the largest inscribed circle defining the inscribed circular opening of the top opening of the waste aperture.

In one or more embodiments of waste apertures as used in poultry containers as described herein, the top openings of the waste apertures may be generally hexagonal, with an inscribed circular opening having six extension openings extending outward from the inscribed circular opening as described above in connection with the illustrative embodiment of waste aperture 150 (and also seen in waste apertures 50). In one or more alternative embodiments of top openings of waste apertures used in poultry containers as described herein, the top openings may be defined by an inscribed circular opening having two or more extension openings extending outward from the inscribed circular opening (with some specific non-limiting examples being pentagonal, septagonal, octagonal, etc. top openings).

Another manner in which one or more embodiments of the top openings of waste apertures used in poultry containers as described herein may be characterized is in terms of symmetry. In one or more embodiments, for example, a top opening of one illustrative embodiment of a waste aperture such as waste aperture 150 may be described as having a pair of extension openings 158 on opposite sides of a diameter of the inscribed circular opening (defined by inscribed circle 156) that are symmetrical with each other about an axis of symmetry coincident with the diameter of the inscribed circle. In one or more alternative embodiments, the top opening may include two or more pairs of extension openings 158 on opposite sides of a diameter of the inscribed circle 156 defining the inscribed circular opening that are symmetrical with each other about an axis of symmetry coincident with the diameter defining each of said opposite pairs of extension openings 158.

Figure 13:
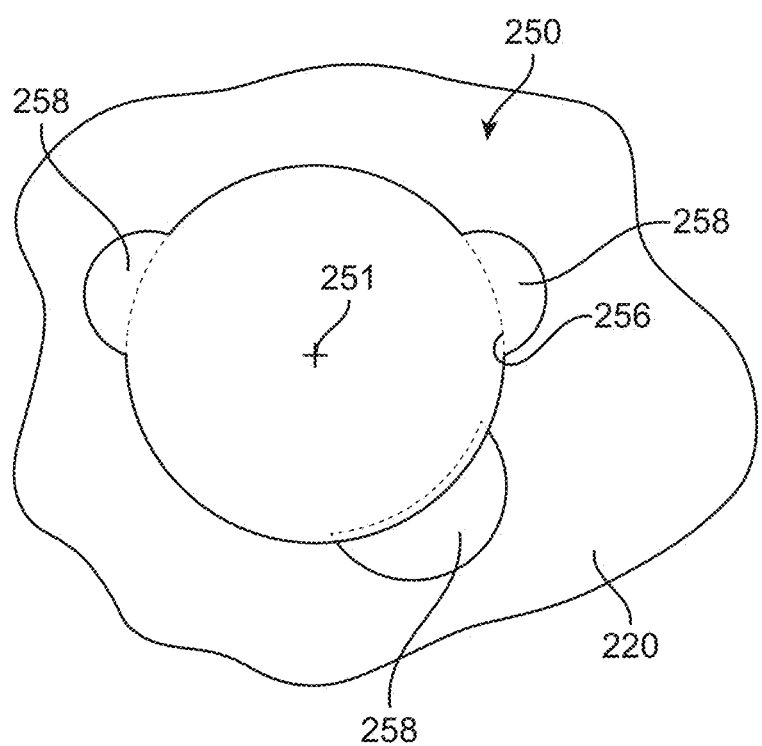
FIG. 13 is an enlarged view of another alternative embodiment of a top opening of a waste aperture that may be used in the floor of one or more embodiments of the poultry containers described herein.

Another illustrative embodiment of a top opening of a waste aperture that may be used in one or more embodiments of a poultry container as described herein is depicted in FIG. 13. The waste aperture 250 includes a top opening that may also be described as being in the form of an inscribed circular opening having a plurality of extension openings extending outwardly from the inscribed circular opening to enlarge a top opening area occupied by the top opening of the waste aperture 250 on the top surface of the floor 220 of one or more embodiments of a poultry container as described herein. With reference to FIG. 13, the inscribed circular opening of the top opening of the waste aperture 250 is defined by the largest inscribed circle 256 (having a center at, e.g., 251) that fits within the top opening of the waste aperture 250. The area of the top opening of the waste aperture 250 is further defined by the extension openings 258 that extend outwardly from the inscribed circle 256 (e.g., radially away from the center 251) to enlarge the size/area of the top opening of the waste aperture 250. The extension openings 258 are one example of a set of extension openings that are not uniform in any of size, shape, or distribution about the inscribed circle 256. The variations in relative sizes between the inscribed circular area (within the inscribed circle 256) and the area of the extensions openings 258, the maximum dimension across the top opening, and/or the minimum diameter of the inscribed circle can all be applied to this and other alternative embodiments of top openings of waste apertures used in one or more embodiments of poultry containers as described herein.

The illustrative embodiments of poultry containers that may be used in stackable poultry container systems as described herein may be manufactured of any suitable material or combination of materials including, e.g., metals, plastics, wood, ceramic, etc. Further, although the illustrative embodiments of poultry containers described herein may include all of the potential optional features provided in poultry containers of the stackable poultry container systems described herein, it should be understood that poultry containers and stackable poultry container systems may be manufactured with only some of the optional features and those optional features may be combined in any suitable combination of features whether or not the specific combination is described in connection with any of the illustrative embodiments described herein. For example, one or more of the poultry containers of poultry container systems described herein may or may not include the hexagonal waste apertures described herein and/or the feeder apparatus described herein.

The complete disclosure of the patents, patent documents, and publications identified herein are incorporated by reference in their entirety as if each were individually incorporated. To the extent there is a conflict or discrepancy between this document and the disclosure in any such incorporated document, this document will control.

Illustrative embodiments of the stackable poultry container systems and methods of using the same are discussed herein with some possible variations described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

What is claimed is:

1. A stackable poultry container system comprising a first poultry container and a second poultry container, wherein the first poultry container and the second poultry container each comprise:
   a floor comprising a top surface, bottom surface and perimeter surrounding the floor;
   a plurality of waste apertures formed through the floor, wherein each waste aperture of the plurality of waste apertures extends through the floor from an opening at the top surface of the floor to an opening at the bottom surface of the floor, wherein the top opening of each waste aperture of the plurality of waste apertures comprises six sides arranged in a hexagonal pattern about a center of the top opening, and a protrusion extending inwardly towards the center between each pair of adjacent sides;
   one or more perimeter supports positioned about the perimeter of the floor, wherein the one or more perimeter supports are configured to support the second poultry container above the first poultry container; and
   a feeder apparatus located within the perimeter of the floor, wherein the feeder apparatus comprises:
      a feed tray positioned above the top surface of the floor;
      a feeder column comprising a top opening, a bottom opening and a wall defining a passageway between the top opening and the bottom opening; and
      a feed aperture in the wall, wherein the feed aperture is located above the feed tray and below the top opening of the feeder column, and wherein the feed aperture is configured to deliver feed into the feed tray when the feeder column is filled with feed to a level at or above the feed aperture;
   wherein the one or more perimeter supports are configured to support the second poultry container above the first poultry container such that the bottom opening of the feeder column of the second poultry container is aligned with the top opening of the feeder column of the first poultry container, wherein feed passing through the passageway of the feeder column of the second poultry container passes into the passageway of the feeder column of the first poultry container through the top opening of the feeder column of the first poultry container.

2. A system according to claim 1, wherein each waste aperture of the plurality of waste apertures comprises a cross-sectional area measured transverse to an aperture axis extending through the top and bottom openings of the waste aperture that increases when moving along the aperture axis from the top opening towards the bottom opening.

3. A system according to claim 1, wherein the system further comprises a waste shield located above the top surface of the floor of the first poultry container and below the bottom surface of the floor of the second poultry container, wherein the waste shield is configured to capture waste passing through the waste apertures of the floor of the second poultry container before the waste reaches the top surface of the floor of the first poultry container.

4. A system according to claim 1, wherein the feed tray surrounds the feeder column of the feeder apparatus on the floor.

5. A system according to claim 1, wherein the feeder apparatus comprises a plurality of barriers extending from the feeder column towards an outer perimeter of the feed tray, wherein the feed tray is separated into a plurality of feed tray sections by the plurality of barriers.

6. A system according to claim 5, wherein the feeder apparatus comprises a plurality of feed apertures in the wall of the feeder column, wherein each feed tray section is aligned with one or more of the feed apertures such that feed passing through the one or more feed apertures is delivered into the feed tray section aligned with the one or more feed apertures.

7. A system according to claim 6, wherein one or more feed tray sections of the plurality of feed tray sections comprises a feed diverter located between the outer perimeter of the feed tray and the feeder column, the feed diverter configured to divert change a direction of travel of at least a portion of feed delivered into the feed tray section from the one or more feed apertures aligned with the feed tray section.

8. A stackable poultry container system comprising a first poultry container and a second poultry container, wherein the first poultry container and the second poultry container each comprise:
   a floor comprising a top surface, bottom surface and perimeter surrounding the floor;
   a plurality of waste apertures formed through the floor, wherein each waste aperture of the plurality of waste apertures extends through the floor from a top opening at the top surface of the floor to a bottom opening at the bottom surface of the floor;
   wherein the top opening of each waste aperture of the plurality of waste apertures is in the form of an inscribed circular opening having a plurality of extension openings extending outwardly from the inscribed circular opening to enlarge a top opening area occupied by the top opening on the top surface of the floor;
   wherein each extension opening of the plurality of extension openings occupies an extension area on the top surface of the floor that is at least 2% of an inscribed circular opening area occupied by the inscribed circular opening;
   wherein a sum of all of the extension areas occupied by the plurality of extension areas is no more than 30% of the inscribed circular opening area;
   and wherein a maximum dimension across each top opening of the plurality of top openings is 15 millimeters or less.

9. A system according to claim 8, wherein the extension area occupied by each extension opening of the plurality of extension openings is 10% or less of the inscribed circular opening area occupied by the inscribed circular opening.

10. A system according to claim 8, wherein the extension area occupied by each extension opening of the plurality of extension openings is 5% or less of the inscribed circular opening area occupied by the inscribed circular opening.

11. A system according to claim 8, wherein the sum of all of the extension areas occupied by the plurality of extension areas is no more than 25% of the inscribed circular opening area.

12. A system according to claim 8, wherein the sum of all of the extension areas occupied by the plurality of extension areas is no more than 20% of the inscribed circular opening area.

13. A system according to claim 8, wherein the maximum dimension across each top opening of the plurality of top openings is 13 millimeters or less.

14. A system according to claim 8, wherein a minimum diameter of the inscribed circular opening of each top opening of the plurality of top openings is 8 millimeters or more.

15. A system according to claim 8, wherein a minimum diameter of the inscribed circular opening of each top opening of the plurality of top openings is 10 millimeters or more.

16. A system according to claim 8, wherein the plurality of extension openings are arranged in a uniform pattern about the inscribed circular opening.

17. A system according to claim 8, wherein a pair of extension openings on opposite sides of a diameter of the inscribed circular opening are symmetrical with each other about an axis of symmetry coincident with the diameter.

18. A system according to claim 8, wherein two or more pairs of extension openings on opposite sides of a diameter of the inscribed circular opening are symmetrical with each other about an axis of symmetry coincident with the diameter.

19. A system according to claim 8, wherein the plurality of extension openings comprises six extension openings, and wherein the six extension openings are arranged in a hexagonal pattern about a center of the inscribed circular opening.

20. A system according to claim 8, wherein each waste aperture of the plurality of waste apertures comprises a cross-sectional area measured transverse to an aperture axis extending through the top and bottom openings of the waste aperture that increases when moving along the aperture axis from the top opening towards the bottom opening.

21. A system according to claim 8, wherein the system further comprises a waste shield located above the top surface of the floor of the first poultry container and below the bottom surface of the floor of the second poultry container, wherein the waste shield is configured to capture waste passing through the waste apertures of the floor of the second poultry container before the waste reaches the top surface of the floor of the first poultry container.

22. A system according to claim 21, wherein the first poultry container comprises a wall extending upward from the floor, wherein the wall and floor of the first poultry container, together with the waste shield, define a closed containment volume located between the floor of the first poultry container and the waste shield.

23. A system according to claim 8, wherein the first and second poultry trays each comprise a feeder apparatus located within the perimeter of the floor, the feeder apparatus comprising:
a feed tray positioned above the top surface of the floor;
a feeder column comprising a top opening, a bottom opening and a wall defining a passageway between the top opening and the bottom opening; and
a feed aperture in the wall, wherein the feed aperture is located above the feed tray and below the top opening of the feeder column, and wherein the feed aperture is configured to deliver feed into the feed tray when the feeder column is filled with feed to a level at or above the feed aperture; and
one or more perimeter supports positioned about the perimeter of the floor, wherein the one or more perimeter supports are configured to support the second poultry container above the first poultry container, and wherein the bottom opening of the feeder column of the second poultry container is aligned with the top opening of the feeder column of the first poultry container, wherein feed passing through the passageway of the feeder column of the second poultry container passes into the passageway of the feeder column of the first poultry container through the top opening of the feeder column of the first poultry container.

24. A system according to claim 23, wherein the perimeter of the floor comprises a geometric center, and wherein the geometric center is located within the feeder column of the feeder apparatus.

25. A method comprising:
placing a bird in a first poultry container;
placing a waste sheet over a portion of the first poultry container after placing the bird in the first poultry container;
stacking a second poultry container on the first poultry container after placing the waste sheet over a portion of the first poultry container;
wherein the first poultry container and the second poultry container each comprise:
a floor comprising a top surface, bottom surface and perimeter surrounding the floor;
a plurality of waste apertures formed through the floor, wherein each waste aperture of the plurality of waste apertures extends through the floor from an opening at the top surface of the floor to an opening at the bottom surface of the floor, wherein the top opening of each waste aperture of the plurality of waste apertures comprises six sides arranged in a hexagonal pattern about a center of the top opening, and a protrusion extending inwardly towards the center between each pair of adjacent sides; and
a feeder apparatus located within the perimeter of the floor, the feeder apparatus comprising:
a feed tray positioned above the top surface of the floor;
a feeder column comprising a top opening, a bottom opening and a wall defining a passageway between the top opening and the bottom opening; and
a feed aperture in the wall, wherein the feed aperture is located above the feed tray and below the top opening of the feeder column;
wherein the bottom opening of the feeder column of the second poultry container is aligned with the top opening of the feeder column of the first poultry container; and
delivering feed into the top opening of the feeder column of the second poultry container such that the feed passes into the top opening of the feeder column of the first poultry container through the bottom opening of the feeder column of the second poultry container, and wherein feed is delivered into the top opening of the feeder column of the second poultry container until the feeder columns of the first and second poultry containers are filled with feed above the feed aperture in the feeder column of the second poultry container.

26. A method according to claim 25, wherein each waste aperture of the plurality of waste apertures comprises a cross-sectional area measured transverse to an aperture axis extending through the top and bottom openings of the waste aperture that increases when moving along the aperture axis from the top opening towards the bottom opening.

27. A method according to claim 25,
- wherein a first portion of the feed passes into the feed tray of the feeder apparatus of the first poultry container through the feed aperture in the feeder column of the first poultry container,
- wherein a second portion of the feed passes into the feed tray of the feeder apparatus of the second poultry container through the feed aperture in the feeder column of the second poultry container,
- and wherein a third portion of the feed remains in the feeder columns of the first and second poultry apparatus until feed is removed from the feed trays of the first or second poultry containers.

28. A method according to claim 27, wherein the method comprises delivering additional feed into the top opening of the feeder column of the second poultry container as the third portion of the feed moves into the feed trays of the first and/or second poultry containers.

\* \* \* \* \*

UNITED STATES PATENT AND TRADEMARK OFFICE
CERTIFICATE OF CORRECTION

PATENT NO. : 10,375,934 B2
APPLICATION NO. : 15/164115
DATED : August 13, 2019
INVENTOR(S) : Richard Huisinga et al.

Page 1 of 1

It is certified that error appears in the above-identified patent and that said Letters Patent is hereby corrected as shown below:

In the Claims

Column 24, Line 26, cancel the word 'divert'

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*